(12) United States Patent
Ansari

(10) Patent No.: US 12,499,076 B2
(45) Date of Patent: Dec. 16, 2025

(54) INLINE CONFIGURATION PROCESSOR

(71) Applicant: XILINX, INC., San Jose, CA (US)

(72) Inventor: Ahmad R. Ansari, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 18/200,438

(22) Filed: May 22, 2023

(65) Prior Publication Data

US 2024/0394216 A1  Nov. 28, 2024

(51) Int. Cl.
*G06F 15/78* (2006.01)
*G06F 13/28* (2006.01)

(52) U.S. Cl.
CPC .......... *G06F 15/7821* (2013.01); *G06F 13/28* (2013.01); *G06F 15/7867* (2013.01); *G06F 15/7871* (2013.01)

(58) Field of Classification Search
CPC .. G06F 15/7821; G06F 13/28; G06F 15/7867; G06F 15/7871
See application file for complete search history.

(56) References Cited

U.S. PATENT DOCUMENTS

| | | | | |
|---|---|---|---|---|
| 6,298,430 B1 * | 10/2001 | Roussakov | ......... | G06F 15/7867 709/200 |
| 7,451,302 B2 * | 11/2008 | Michaelis | ........... | G06F 15/7867 713/1 |
| 8,103,853 B2 * | 1/2012 | Ramesh | ................... | G06F 15/16 712/15 |
| 10,680,615 B1 * | 6/2020 | Schultz | ............ | H03K 19/17728 |
| 11,409,540 B1 * | 8/2022 | Grohoski | ................ | G06F 15/80 |
| 12,056,505 B2 * | 8/2024 | Ansari | ................ | G06F 15/7882 |
| 2001/0015919 A1 | 8/2001 | Kean | | |
| 2018/0089132 A1 * | 3/2018 | Atta | ..................... | G06F 13/4282 |
| 2019/0042090 A1 * | 2/2019 | Raghunath | .......... | H04L 43/0876 |
| 2024/0012655 A1 * | 1/2024 | Ansari | ................ | G06F 15/7882 |

OTHER PUBLICATIONS

International Search Report and Written Opinion from PCT/US2024/028437 dated Jul. 29, 2024.
U.S. Appl. No. 17/862,257, filed Jul. 11, 2022 Entitled "Distributed Configuration of Programmable Devices".

* cited by examiner

*Primary Examiner* — Corey S Faherty
(74) *Attorney, Agent, or Firm* — Patterson + Sheridan, LLP

(57) ABSTRACT

An integrated circuit (IC) device includes functional circuitry and distributed management circuitry that includes multiple configuration interface manager (CIM) circuits that receive respective programming partitions as configuration packets over a first communication channel (e.g., a network-on-chip, or NoC), and perform management operations on respective regions of the functional circuitry in parallel with one another based on the respective configuration packets, including providing configuration parameters to the respective regions of the functional circuitry. The configuration packets may be streamed to the CIM circuits from a central manager and/or read by direct memory access (DMA) engines of the CIM circuits. The central manager may configure the CIM circuits and the NoC over a second communication channel (e.g., a global communication ring interconnect) during an initialization phase. The CIM circuits may include respective packet processors, random-access-memory, authentication circuitry, error detection circuitry, and interconnect circuitry having standardized bus-widths.

19 Claims, 19 Drawing Sheets

FIG. 12 (1200)

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h00 | 0 | 0 | 0 | 0 | 0 | 0 | 0 | Word1 Data [31:0] | Address [31:2] | 0 |

FIG. 13 (1300)

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h00 | 0 | 0 | 0 | 0 | Condition Reg [3:0] | 0 | 0 | Word1 Data [31:0] | Address [31:2] | 0 |

FIG. 14 (1400)

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h08 | 0 | 0 | 0 | 0 | Condition Reg [3:0] | 0 | 0 | Word1 Data [31:0] | Address [31:2] | 0 |

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h0C | 0 | 0 | 0 | 0 | Condition Reg [3:0] | 0 | 0 | Word1 Data [31:0] | Address [31:2] | 0 |

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h08 | 0 | 1 | 0 | 0 | Condition Reg [3:0] | 0 | 0 | Word1 Data [31:0] | Address [31:2] | 0 |

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h0C | 0 | 1 | 0 | 0 | Condition Reg [3:0] | 0 | 0 | Word1 Data [31:0] | Address [31:2] | 0 |

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h01 | 0 | 0 | 0 | 0 | 0 | 0 | Word2 Data [31:0] | Word1 Data [31:0] | Address [31:2] | 0 |

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h01 | 0 | 1 | 0 | 0 | 0 | 0 | Word2 Data [31:0] | Word1 Data [31:0] | Address [31:2] | 0 |

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h09 | 0 | 0 | 0 | 0 | Condition Reg [3:0] | 0 | Word2 Data [31:0] | Word1 Data [31:0] | Address [31:2] | 0 |

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h0D | 0 | 0 | 0 | 0 | Condition Reg [3:0] | 0 | Word2 Data [31:0] | Word1 Data [31:0] | Address [31:2] | 0 |

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h02 | Length | 0 | 0 | 0 | 0 | 0 | 0 | 0 | Address [31:4] | 0 |
| First Write Data Quadword | | | | | | | | | | |
| ... | | | | | | | | | | |
| Last Write Data Quadword | | | | | | | | | | |

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h0D | 0 | 0 | 2'h2 | 0 | Condition Reg [3:0] | 0 | Comp Value [31:0] | Mask [31:0] | 0 | 0 |

| 127:120 | 119:112 | 111 | 110:109 | 108:104 | 103:100 | 99:96 | 95:64 | 63:32 | 31:2 | 1:0 |
|---|---|---|---|---|---|---|---|---|---|---|
| 8'h20 | 0 | 0 | 2'h2 | 0 | 0 | 0 | Value [31:0] | Mask [31:0] | Address [31:2] | 0 |

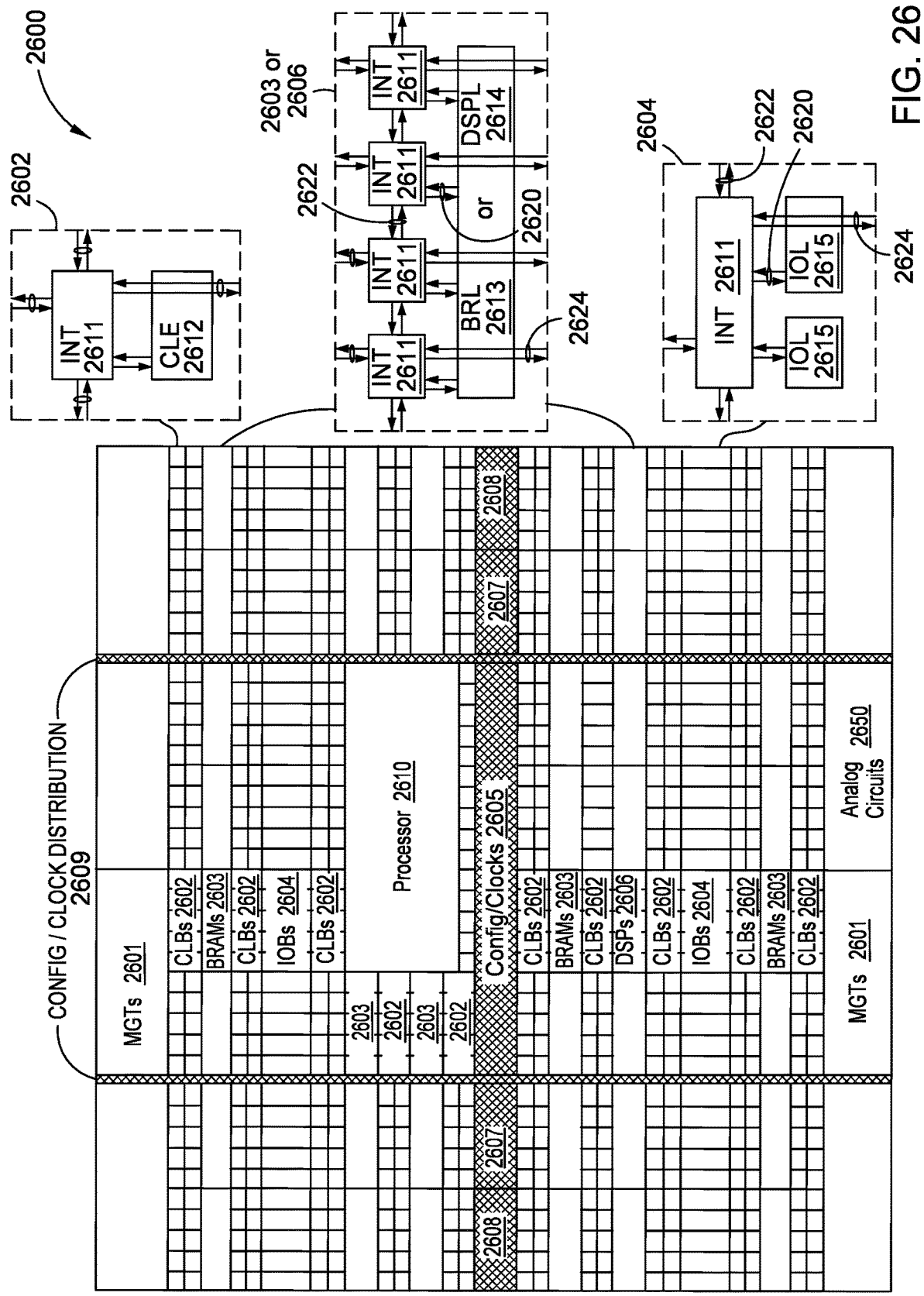

INLINE CONFIGURATION PROCESSOR

TECHNICAL FIELD

Examples of the present disclosure generally relate to an inline configuration interface processor.

BACKGROUND

Traditionally, programmable integrated circuit (IC) devices (e.g., field-programmable gate arrays, or FPGAs) are configured directly through a processor-based central configuration manager. This may be acceptable for relatively small and monolithic IC devices. Newer programmable IC devices may include multiple heterogeneous subsystems (e.g., systems-on-chip (SOCs), networks-on-chip (NoCs), memory controllers, artificial intelligence engines, hardened network interface controllers (HNICs), coherent peripheral component interconnect express (PCIe) modules (CPMs), video display units (VDUs), and/or other heterogeneous subsystems, which typically require respective programming interfaces and information. Additionally, these subsystems may directly interface with FPGA fabric, which has become orders of magnitude larger in newer programmable devices, especially with the advent of the stacked IC dies. Configuration and partial reconfiguration of such IC devices may necessitate a combination of various configuration partitions that need to be provided through the respective interfaces. With such complex heterogeneous IC devices, a traditional centralized configuration manager becomes a bottleneck during configuration and initialization. The size and heterogeneous nature of programming images for such devices has rendered configuration through a centralized processing manager inefficient.

SUMMARY

Techniques for inline configuration interface processing are described. One example is an integrated circuit (IC) device that includes functional circuitry, a packet-switched network-on-chip (NoC), and distributed management circuitry that includes a plurality of configuration interface manager (CIM) circuits that receive respective programming partitions as configuration packets over the NoC, and provide configuration parameters to respective regions of the functional circuitry in parallel with one another based on the respective configuration packets.

Another example described herein is an IC device that includes a first IC die that includes distributed management circuitry, a packet-switched network-on-chip (NoC), and first functional circuitry, a second IC die that includes second functional circuitry, and a chip-to-chip (C2C) communication channel configured to interface between the NoC and the second IC die. The distributed management circuitry includes a plurality of configuration interface manager (CIM) circuits configured to receive respective programming partitions as configuration packets over the NoC, and provide configuration parameters to respective regions of the first functional circuitry in parallel with one another based on the respective configuration packets. A first one of the CIM circuits also receives a programming partition for the second IC die as additional configuration packets over the NoC, and provides configuration parameters to the second IC die through the NoC and the C2C interface circuitry based on the additional configuration packets.

Another example described herein is an IC device that includes functional circuitry and distributed management circuitry that includes a plurality of configuration interface manager (CIM) circuits that receive respective programming partitions as configuration packets over a packet-switched network-on-chip (NoC), extract commands from the respective configuration packets, and perform operations related to respective regions of the functional circuitry based on codes contained within fields of the commands, in parallel with one another.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 12 illustrates a memory word write (MWW) command that allows the packet processor to write a value to a bit-aligned address in a memory map, according to an embodiment.

FIG. 13 illustrates a synchronized memory word write (SMWW) command that allows the packet processor to write a value to a bit-aligned address in the memory map, and to stall issuance of further instructions until the SMWW command completes, according to an embodiment.

FIG. 14 illustrates a conditional true memory word write (TMWW) command that allows the packet processor to write a value to a bit-aligned address in the memory map, if a specified condition is true, according to an embodiment.

FIG. 15 illustrates a conditional false memory word write (FMWW) command that allows the packet processor to write a value to a bit-aligned address in the memory map if a specified condition is false, according to an embodiment.

FIG. 16 illustrates a conditional true synchronized memory word write (TSMWW) command that allows the packet processor to write a value to a bit-aligned address in the memory map if a specified condition is true, and to stall issuance of further instructions until the TSMWW command completes, according to an embodiment.

FIG. 17 illustrates a conditional false synchronized memory word write (FSMWW) command that allows the packet processor to write a value to a bit-aligned address in the memory map if a specified condition is false, and to stall issuance of further instructions until the FSMWW command completes, according to an embodiment.

FIG. 18 illustrates a memory doubleword write (MDW) command that allows the packet processor to write a doubleword value to a bit-aligned address in the memory map, according to an embodiment.

FIG. 19 illustrates a synchronized memory doubleword write (SMDW) command that allows the packet processor to write a doubleword value to a bit-aligned address in the memory map, and to stall issuance of further instructions until the SMDW command completes, according to an embodiment.

FIG. 20 illustrates a conditional true memory doubleword write (TMDW) command that allows the packet processor to write a doubleword value to a bit-aligned address in the memory map if a specified condition is true, according to an embodiment.

FIG. 21 illustrates a conditional false memory doubleword write (FMDW) command that allows the packet processor to write a doubleword value to a bit-aligned address in the memory map if a specified condition is false, according to an embodiment.

FIG. 22 illustrates a memory quadword write (MQW) command that allows the packet processor to write a selectable number of quadwords to a bit-aligned address in the memory map, according to an embodiment.

FIG. 23 illustrates a compare (C) command that allows the packet processor to compare a masked value of the least significant word of a local data register (LDR) of the packet processor with a specified value, and set a condition register based on the comparison, according to an embodiment.

FIG. 24 illustrates a mask LDR word & write (MLWW) command that allows the packet processor to force different bits in the least significant word of the LPR to specified values, and to write the resulting word in a specified address in memory.

FIG. 26 is a block diagram of programmable logic, or configurable circuitry, including an array of configurable or programmable circuit blocks or tiles, according to an embodiment.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
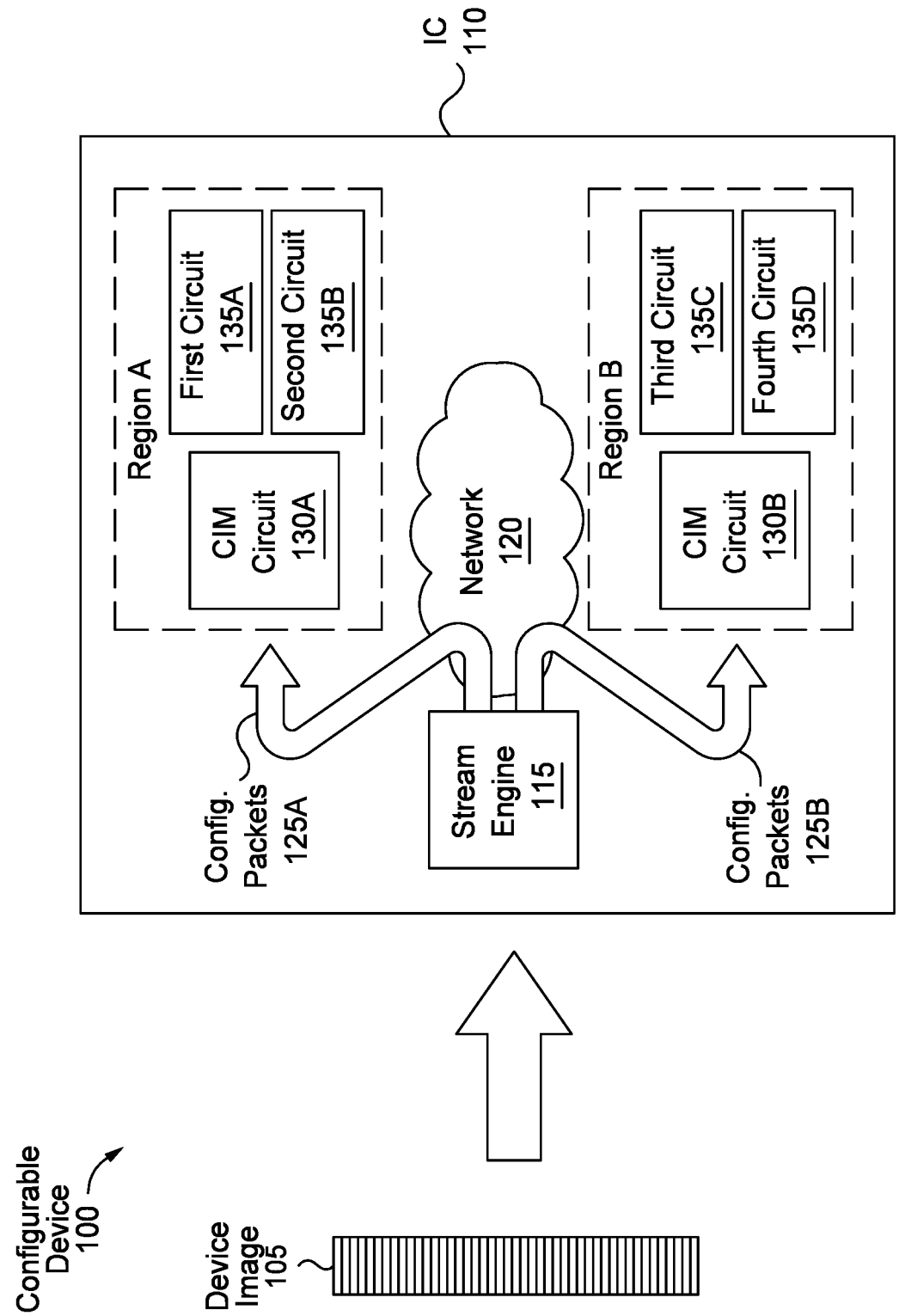
FIG. 1 illustrates configuring an integrated circuit (IC) using a distributed system, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Modern adaptive system-on-chip IC devices may include programmable logic, fixed/hardened circuitry, NoCs, complex heterogeneous subsystem, input/output circuitry, and other circuitry, distributed throughout an IC die, multiple stacked IC dies, and/or, chiplets. The varying natures of the components require respective configuration interfaces and forms of configuration images and sequencing. Distributing configuration parameters throughout such an IC device with a traditional, centralized management system is inefficient and may increase device configuration/initialization times, add complexity to the memory and firmware used for device configuration and initialization, and add complexity to the programming image for the device (e.g., may necessitate separate partitions for subsystems that have different configuration interfaces).

Embodiments herein describe a centralized management system and distributed in-line configuration interface managers (CIMs). The centralized management system distributes configuration packets to the CIMs at a line rate. The CIMs configure respective regions of the IC device based on the respective configuration packets, in parallel with one another. The centralized management system may enforce overall security of the IC and may include a unified application-programming interface (API) that interfaces with a user.

Architectures disclosed herein provide a scalable solution for configuring and initializing an IC device. Architectures disclosed herein may provide orders of magnitude improvement in configuration and initialization, without adding complexity to a user interface. Architectures disclosed may reduce complexity of firmware customization, optimization, and validation.

FIG. 1 illustrates configuring a configurable integrated circuit (IC) device 100 using a distributed system, according to an embodiment. In the example of FIG. 1, configurable IC device 100 includes a single integrated circuit (IC) 110. In one embodiment, the IC 110 includes a heterogeneous computing system that includes different types of subsystems (e.g., NoCs, data processing engines, memory controllers, programmable logic, etc.) that are configured using configuration information in a device image 105. For example, the IC 110 can be a SoC or an application specific integrated circuit (ASIC).

In another embodiment, the IC 110 includes a homogeneous computing system. While the distributed configuration system described herein can offer the most improvement to a device that has a heterogeneous computing system (due to having a mix of various configuration partitions that are transferred through distinct interfaces), the embodiments herein can also improve the process of configuring homogenous computing systems, especially when those systems become larger. For example, the IC 110 may be a large field programmable array (FPGA) that includes programmable logic that is configured by the device image 105.

Notably, a configurable device is not limited to having programmable logic. That is, the embodiments here can be applied to a configurable device that does or does not include programmable logic. The distributed configuration system described herein can be used in any configurable device that relies on a received device image 105 to configure at least one subsystem in the device before the device begins to perform a user function.

The IC 110 includes a stream engine 115 (e.g., circuitry) that receives the device image 105 for configuring IC device 100. The stream engine 115 is one example of a central configuration manager circuitry and in other embodiments the stream function can be implemented using back-to-back memory mapped transfers at the physical interface level. Thus, the stream engine 115 can be a memory-mapped engine that receives the device image through memory-mapped data write.

As shown, the stream engine 115 receives the device image 105 composed of packetized configuration data and then forwards respective configuration (config) packets 125 to different regions in the IC 110. The stream engine 115 can serve as the user interface with APIs to communicate with an external host computing system (not shown). The stream engine 115 is discussed in more detail below, but generally, this hardware component distributes the configuration information contained in the device image 105 to the various regions of the IC 110 in the form of config packets 125.

To distribute the config packets 125, the IC 110 includes a hardware network 120. In one embodiment, the network 120 is a NoC, but is not limited to such. For example, the IC 110 may have dedicated configuration traces that are used to distribute the config packets 125 to the different regions in the IC 110. The type of hardware network being used can impact how the stream data is transferred at the physical level from the central configuration manager (e.g., the stream engine 115) to the distributed CIM circuits 130.

In FIG. 1, the IC 110 is subdivided into different regions (e.g., Region A and Region B). While two regions are shown, the IC 110 can be divided into any number of regions. One advantage of the distributed configuration system is that it can easily scale with the size of the configurable IC device 100. That is, as the size of the IC 110 increases, additional regions can be added.

Each region in the IC 110 includes a dedicated CIM circuit 130 for distributing configuration information to subsystems in that region. That is, the stream engine 115 can receive the device image 105 and distribute the packetized configuration information so that data used to configure the subsystems in Region A is transmitted to CIM circuit 130A while data used to configure the subsystems in Region B is transmitted to CIM circuit 130B.

Although not shown here, the CIM circuits 130 can have respective interfaces or ports to the subsystems in their respective regions. For example, the CIM circuit 130A can parse the received config packets 125A and transmit configuration information to different circuitry in the region. In this case, Region A include first circuit 135A and second circuit 135B. These circuits may be different (i.e., heterogeneous) circuitry. For example, the first circuit 135A may be memory controller and the second circuit 135B may be a hardened data processing engine. These circuits may use different types of interfaces to communicate with the CIM circuit 130A and use different types of configuration data. Rather than the central configuration manager (e.g., the stream engine 115) having to parse and distribute the configuration information to all the subsystems in the IC, in this example, the stream engine 115 can forward the configuration information to each region and then it is up to the CIM circuit 130 to distribute the configuration information to the circuitry in that region using the different interfaces. However, in another embodiment, the first and second circuits 135A and 135B may be homogeneous circuitry (e.g., both may be memory controllers, or both are programmable logic blocks). Thus, the embodiments herein can be used if the regions have heterogeneous or homogenous circuitry.

Moreover, because the stream engine 115 distributes the configuration information to different regions having dedicated CIM circuits 130, the CIM circuits 130 in each region can operate in parallel. That is, while the CIM circuit 130A distributes configuration information to the first and second circuits 135A and 135B, the CIM circuit 130B can distribute configuration information to third and fourth circuits 135C and 135D. In this manner, the regions in the IC 110 can be configured in parallel by dedicated CIM circuits 130.

Figure 2A:
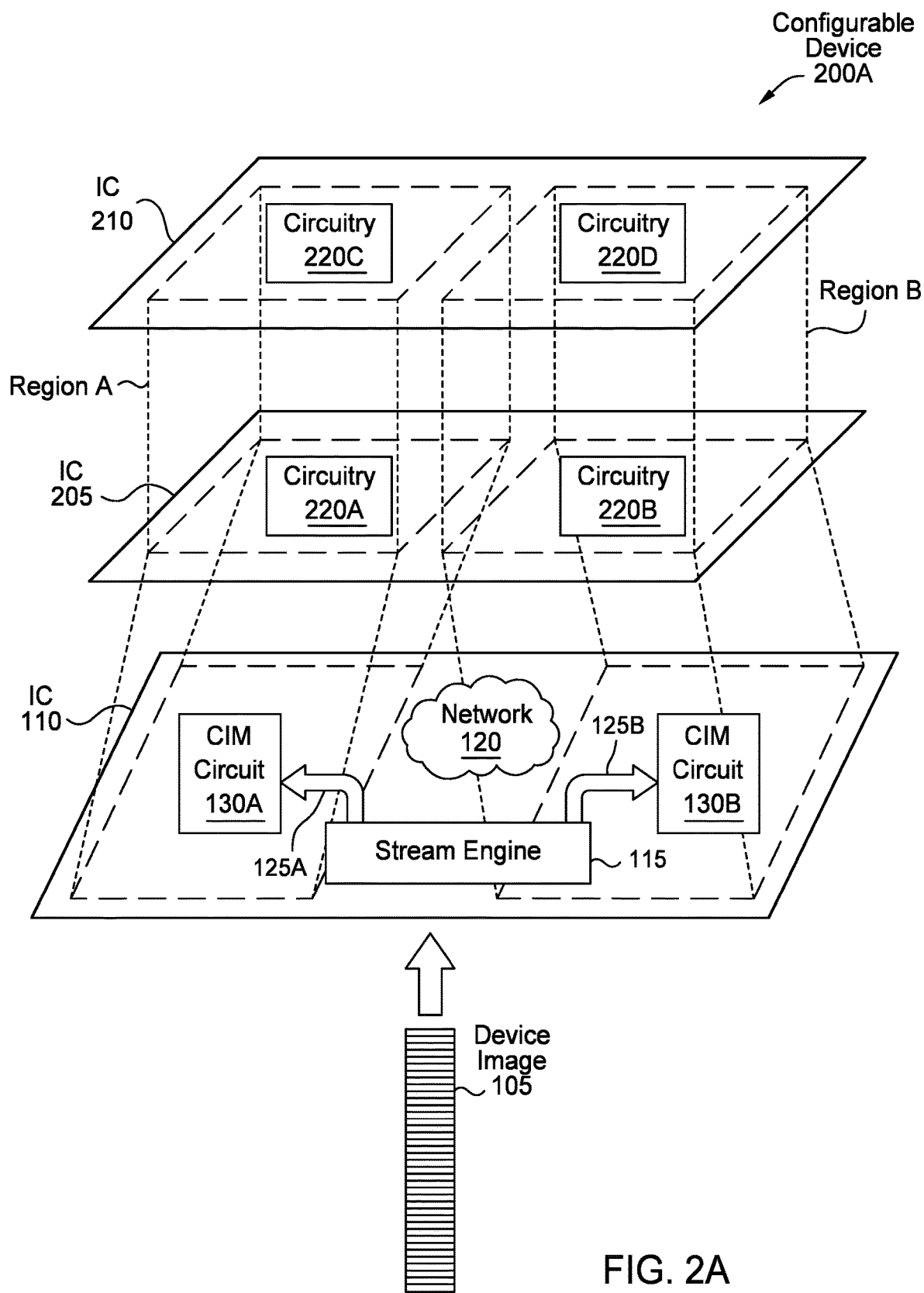
FIGS. 2A and 2B illustrate configuring multiple integrated circuits using a distributed configuration system, according to an embodiment.
Figure 2B:
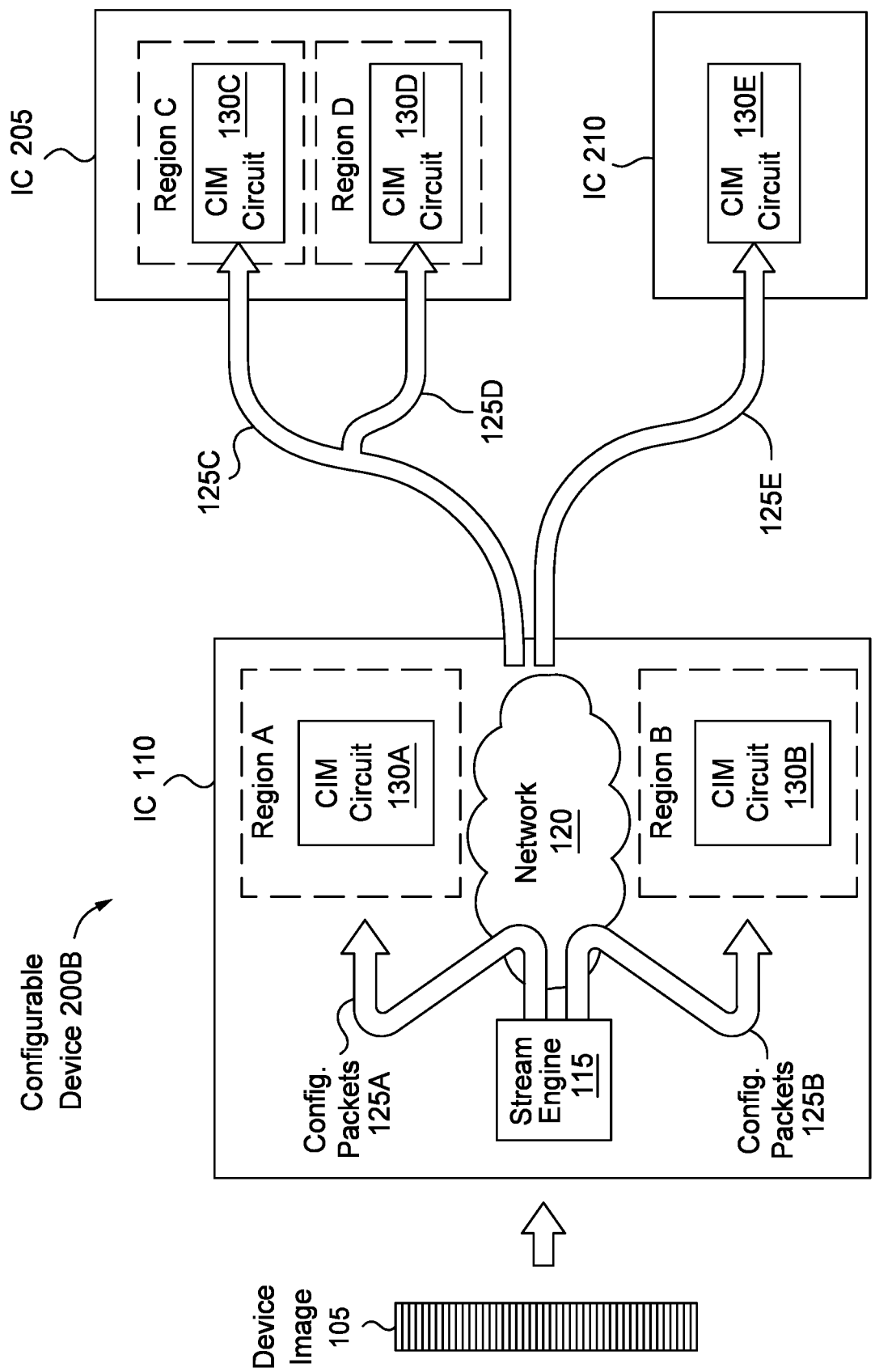

FIGS. 2A and 2B illustrates configuring multiple integrated circuits in a configurable device 200 using a distributed system, according to an embodiment. Unlike the configurable IC device 100 in FIG. 1, the configurable devices 200 in FIGS. 2A and 2B included multiple ICs—i.e., IC 110, IC 205, and IC 210. These ICs may be disposed in the same package. While three ICs are shown, the configurable device 200 can include any number of ICs.

In FIG. 2A, the configurable device 200A, the ICs are arranged in a 3D stack. For example, the IC 110 may be a base die while the ICs 205 and 210 are stacked on top of the base die. For instance, the base die may include peripherals and communication interface for communicating with an external host while the ICs 205 and 210 include different types of circuitry 220 (e.g., programmable logic or an array of data processing engines). The ICs may use through vias in order to transmit data to each other.

The IC 110 in FIG. 2A can be the same IC 110 as shown in FIG. 1 that includes multiple regions, each containing a dedicated CIM circuit 130. Rather than being assigned 2D regions in the same IC as shown in FIG. 1, in FIG. 2A the CIM circuits are assigned 3D regions that span across the three ICs. That is, the CIM circuit 130A is assigned Region A which can include circuitry in IC 110 (not shown), circuitry 220A in IC 205, and circuitry 220C in IC 210. The CIM circuit 130B is assigned Region B which can include circuitry in IC 110 (not shown), circuitry 220B in IC 205, and circuitry 220D in IC 210.

The circuitry 220 in each of the ICs 205 and 210 can be the same or different. In one example, the circuitry 220A and 220B in the IC 205 may be the same (e.g., programmable logic) while the circuitry 220C and 220D in the IC 210 is the same (e.g., data processing engines). Further, the circuitry 220A-D in both of the ICs 205 and 210 may be the same—e.g., all data processing engines.

While FIG. 2A illustrates stacking the ICs, in another embodiment, the ICs may be disposed on an interposer (i.e., side-by-side) where the interposer provides communication channels for transmitting data between the ICs. For example, the IC 110 may be an anchor die while the ICs 205 and 210 are chiplets. In this example, the ICs 205 and 210 may be disposed at different sides of the IC 110. The anchor die can include common blocks such as processor subsystem (PS), memory subsystem (DDR controllers), etc. The chiplets can include dedicated logic such as data processing engines, high-speed transceivers, or high bandwidth memory. In that case, the regions would not be 3D regions, but nonetheless each CIM circuit 130 can be assigned a region that includes portions from each of the three ICs in FIG. 2A.

In summary. FIG. 2A illustrates using CIM circuits 130 in one IC to configure circuitry 220 in different ICs. Thus, the ICs 205 and 210 do not have their own CIM circuitry.

Similar to FIG. 2A, FIG. 2B illustrates a configurable device 200B that has multiple ICs, but unlike FIG. 2A each IC has at least one CIM circuit 130. Moreover, unlike in FIG. 2A where the regions extend across the ICs, in FIG. 2B the regions may be confined in one IC.

Notably, the three ICs in FIG. 2B can be arranged either as a 3D stack as shown in FIG. 2A or side-by-side on an interposer.

The network 120 in the IC 110 can be used to forward config packets to the other ICs 205 and 210. That is, in addition to identifying config packets for the regions on the IC 110, the stream engine 115 also distributes config packets for the regions in the ICs 205 and 210. Because the IC 205 includes two regions (Regions C and D) that have dedicated CIM circuits 130C and 130D, the stream engine 115 transmits config packets 125C to the CIM circuit 130C for configuring the circuitry (not shown) in Region C and different config packets 125D to the CIM circuit 130D for configuring the circuitry (not shown) in Region D.

However, the IC 210 is not divided into multiple regions (although it could be). In this case, the stream engine 115 transmits to the CIM circuit 130E config packets 125E for configuring the circuitry in the IC 210. For example, the IC 210 may be smaller or have less configurable circuitry than the IC 205, and as such, the IC 210 is not divided into regions.

Thus, FIG. 2B illustrates a configurable device 200B that includes multiple ICs where a central configuration manager (e.g., the stream engine 115) on one of the ICs can distribute config packets 125 to CIM circuits 130 on different ICs. These ICs can each have more than one CIM circuit 130, depending on how many regions are in the ICs.

Figure 3:
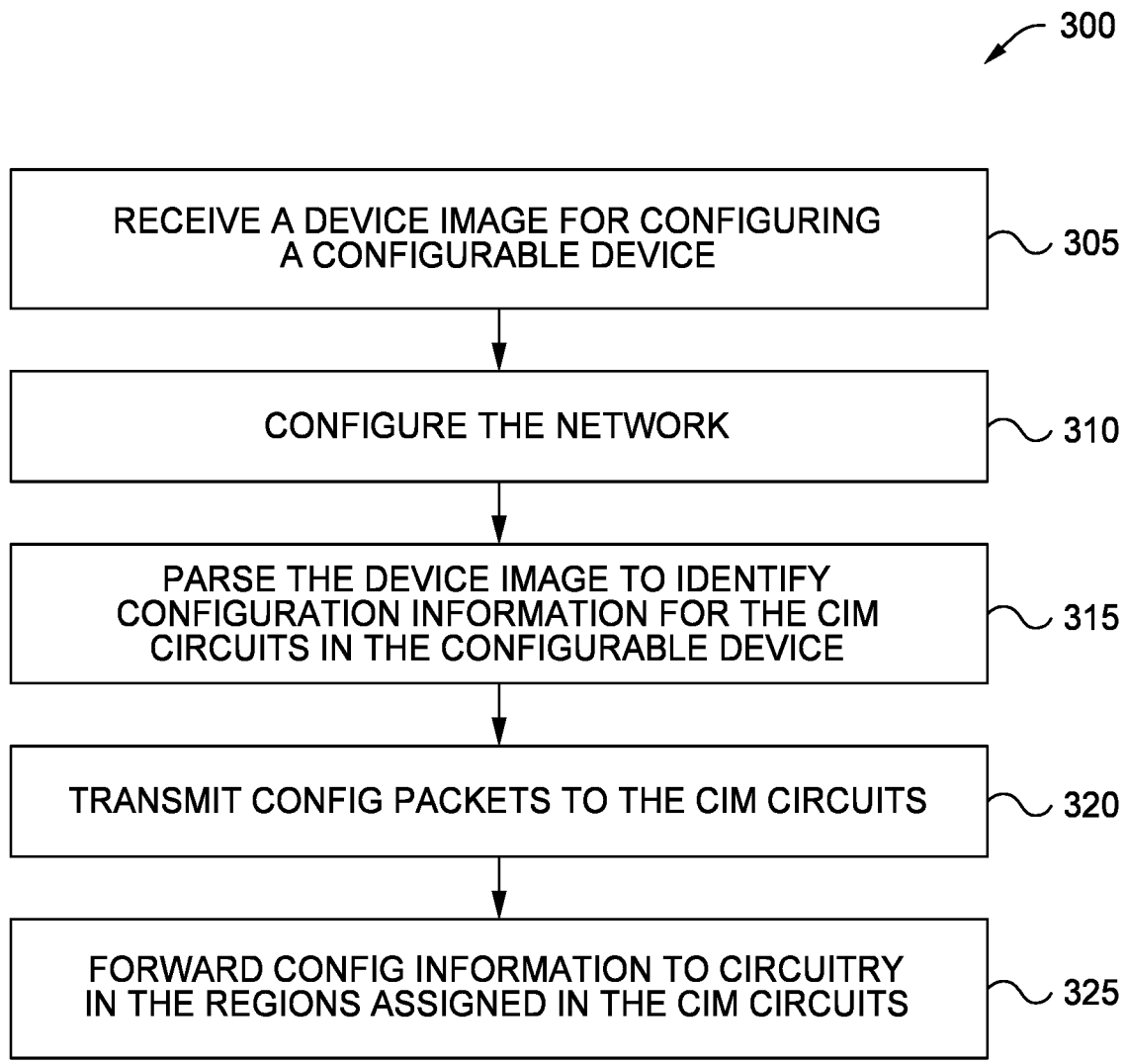
FIG. 3 is a flowchart for configuring a device using a distributed system, according to an embodiment.

FIG. 3 is a flowchart of a method 300 for configuring a device using a distributed system, according to an embodiment. At block 305, the stream engine (e.g., a central configuration manager) receives a device image for configuring a configurable device. The device image can be received as streaming data or memory-mapped data.

The configurable device can include only one IC that includes multiple CIM circuits as shown in FIG. 1, or the configurable device can include multiple ICs as shown in FIGS. 2A and 2B. Regardless, in one embodiment, there is only one stream engine (i.e., only one central configuration manager) in the configurable device.

At block 310, the stream circuit configures a network in the configurable device. In one embodiment, the network is disposed on the same IC that includes the stream circuit. The stream circuit may be configured first in order for the stream circuit to distribute configuration information to the CIM circuits in the configurable device. For example, if the stream circuit uses a NoC to communicate with the CIM circuits, the device image may include data for configuring the NoC so it can communicate with the CIM circuits.

In one embodiment, the stream circuit includes its own CIM circuit for configuring the network. That is, the stream circuit may identify configuration information in the received device image that is intended to configure the network and forward this information to its CIM circuit, which in turn configures the network. The network can be configured to transmit data to CIM circuits on the same IC as well to CIM circuits on other ICs (if the configurable device has multiple ICs that have their own CIM circuits).

At block 315, the stream circuit parses the device image to identify configuration information (e.g., configuration packets) for the CIM circuits in the configurable device. In one embodiment, the device image can include embedded headers indicating what data is intended for which region. That is, the software tool in the host that generates and sends the device image to the configurable device can be aware of the regions in the configurable device. Thus, when generating the device image, the software application can organize the device image so that configuration information for circuitry in a particular region of the device is organized as packet data. Thus, when parsing the device image, the stream circuit can easily identify different portions of the device image destined to different regions (e.g., different CIM circuits) which can be arranged as packets of data. This is discussed in more detail in FIG. 5 below.

In one embodiment, the packetization of the configuration information in the device image can be performed by the stream circuit based on a dynamic scheduling algorithm of relocatable configuration contexts.

At block 320, the stream circuit transmits the config packets to the CIM circuits. That is, after identifying the data in the device image intended for the destination regions, the stream circuit can forward the corresponding config packets to the dedicated CIM circuits in those regions. Thus, each region receives only the configuration information used to configure circuitry in that region.

In one embodiment, the configurable device includes at least two CIM circuits. These CIM circuits may be on the same IC or multiple ICs. Further, a region can include an entire IC, a 2D region that includes only a sub-portion of an IC, or a 3D region that spans across multiple ICs. FIG. 2B illustrates an example where a region can include an entire IC (e.g., IC 210), while FIG. 1 illustrates 2D regions that cover sub-portions of an IC (e.g., IC 110) and FIG. 2A illustrates 3D regions that extend across multiple ICs.

In one embodiment, the communication between the stream circuit and the plurality of CIM circuits is encrypted so that each of the plurality of CIM circuits decrypts the portions (e.g., the configuration packets) received from the central configuration manager circuit. Further, in one embodiment, each of the plurality of CIM circuits is configured to perform an integrity check on the portions (packets) received from the stream circuit.

At block 325, the CIM circuits forward config information to circuitry in the regions assigned to the CIM circuits. That is, the CIM circuits parse the received packets, which can have configuration information for multiple subsystems in the region and identify which configuration information should be sent to which subsystem. The CIM circuits can use different interfaces or ports to the different subsystems in the region if those subsystems are heterogeneous systems.

Advantageously, in the method 300, the stream circuit mainly has the responsibility of streaming the configuration information to the various CIM circuits, as specified by the device image. The actual processing and forwarding of the configuration data to the specific circuits being configured is delegated to the CIMs.

In one embodiment, the CIM circuits operate in two modes. When in a first mode, a direct memory access (DMA) circuit in the stream circuit distributes the configuration information for a region as a continuous stream to the CIM circuit that is responsible for that region. When a configuration packet for a region is buffered in the CIM circuit, the CIM circuit can process the packet while the stream circuit sends configuration packets to other CIM circuits in the configurable device.

When in a second mode (e.g., DRAM mode), the stream circuit copies the configuration packets for every region in a contiguous partition to DRAM a priori and instructs the CIM circuits to pull the packets from their regions in DRAM, concurrently. A contiguous partition is a partition where all the data in that partition is intended to be processed by a single CIM. Local storage in the CIM circuit is used to store the packets that are fetched by the CIM circuit from DRAM for hashing and authentication before use.

Figure 4:
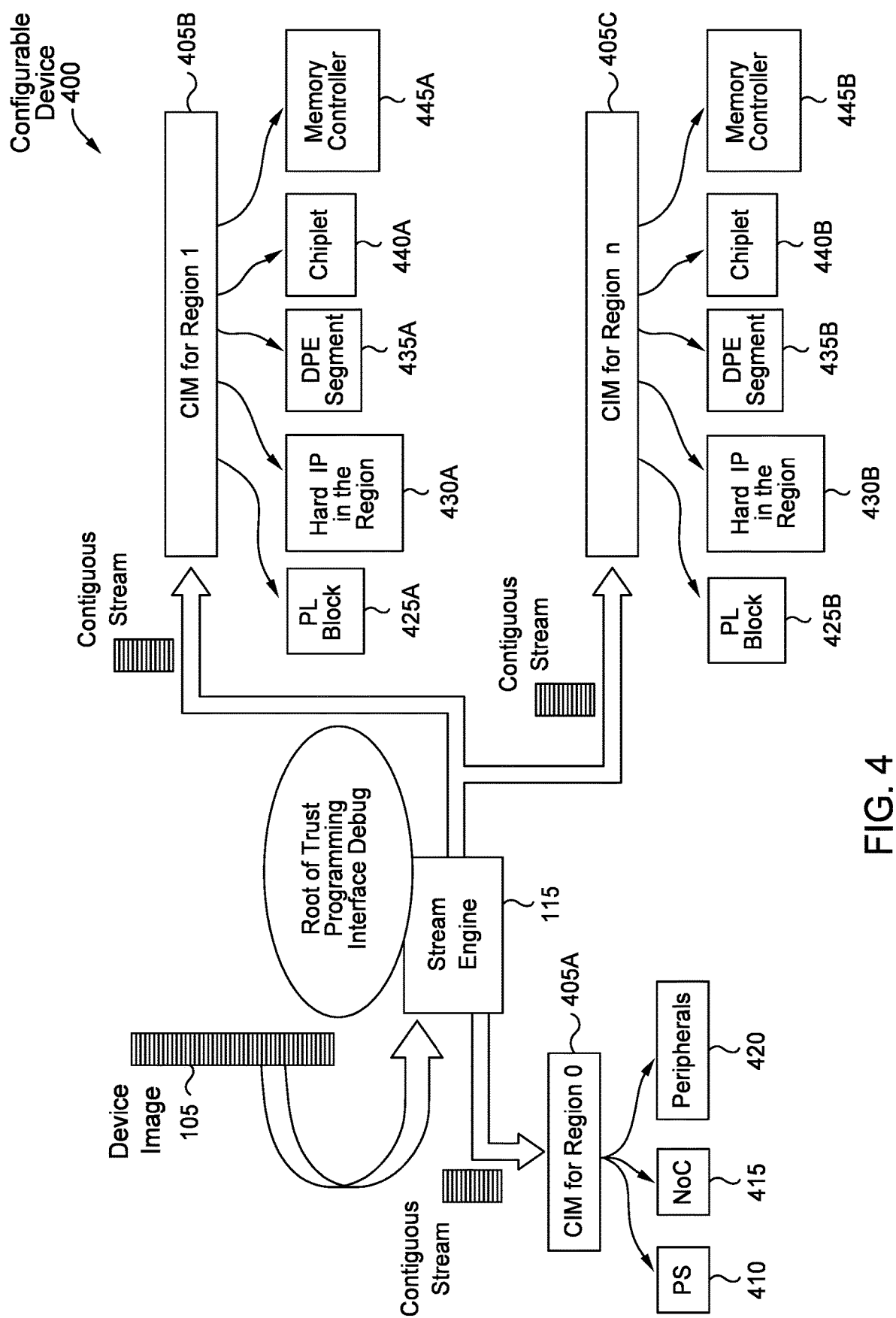
FIG. 4 illustrates configuring a device using a distributed system, according to an embodiment.

FIG. 4 illustrates configuring a configurable device 400 using a distributed system, according to an embodiment. As shown, the configurable device 400 receives a device image 105 at the stream engine 115. In addition to distributing the configuration information in the device image 105 to the different regions as discussed above, the stream engine 115 (e.g., a central configuration manager) can perform other functions. First, the stream engine 115 can create an abstraction level which stays consistent across devices. That is, the stream engine 115 can maintain consistent protocols for all the functions performed by the stream engine 115 independent of the size of the device 400 and mix of features in the device 400. Second, the stream engine 115 can act as a Root-of-Trust for the device 400. In one embodiment, the stream engine 115 authenticates the device image 105 before it is distributed to the CIM circuits. Third, the stream engine 115 can include debug interface logic as well as a debug packet controller for identifying errors that may occur during the configuration process.

In one embodiment, the stream engine 115 is implemented in a processor, which can be a general-purpose processor. However, in other embodiments, the stream engine 115 may be specialized circuitry for performing the functions described herein.

The device 400 includes N number of regions which correspond to N number of CIM circuits 405. In this case, it is assumed that Region 0 is disposed on the same IC as the stream engine 115. This region includes the CIM circuit 405A, a PS 410, NoC 415, and peripherals 420.

The PS 410 may be a general-purpose processor that includes any number of cores. The PS 410 can be one or more processing subsystems that are also configured by a corresponding CIM—i.e., CIM circuit 405A.

Although not shown, the NoC 415 may extend throughout the device 400 to permit the various components in the device 400 to communicate with each other. For example, in one physical implementation, the stream engine 115 may be disposed in an upper right portion of an IC in the configurable device 400 while the CIM circuits 405B and 405C are disposed in the upper left and lower left portions of the IC (or on another IC). However, using the NoC 415, the stream engine 115 can nonetheless communicate with the CIM circuits 405B and 405C in those regions. However, in embodiment, the stream engine 115 may first be required to configure the NoC 415 before it can transmit the configuration information to the CIM circuits 405B and 405C, which was discussed above at block 310 of the method 300.

The peripherals 420 can include I/O circuitry for communicating with external computing systems or devices. For example, the peripherals 420 may include a DMA engine for retrieving memory from the host computing system.

Although shown as being separate, in one embodiment, the CIM circuit 405A is part of the stream engine 115. Customizing firmware in the stream engine 115 (e.g., the central configuration manager) for configuring each subsystem adds complexity and prevents optimization, resulting in larger code size, inefficient execution, and difficulty in validation. Since the processing of the regions is instead performed by the CIMs, and the stream circuit just streams the packets to the CIMs, a common piece of firmware can be used to push a configuration image to every region on the device. These regions can include different IPs and functionalities. Further, by including a CIM circuit in the stream circuit, the same programming model can be adopted for the regions that are directly communicating or integrated with the stream circuit on the same IC. Examples of configuration that is done by the local CIM circuit 405A in the stream engine 115 is the configuration of the PS 410, NoC 415, and peripherals 420.

In this embodiment, Region 1 and Region n can include similar circuit elements, although this is not a requirement. That is, both regions include programmable logic (PL) blocks 425, hard IP 430, an interface to a chiplet 440 (when using the arrangement shown in FIG. 2A), and a memory controller 445. Alternatively, Region 1 may include only programmable logic while Region n includes only DPE segments.

The CIM circuits 405B and 405C can include separate interfaces or ports to the different circuit elements in Region 1 and Region n. Region 1 and Region n may be in the same IC as the Region 0, or may be in separate ICs. For example, Region 0 may be disposed in a first IC while Regions 1 through n are disposed in a second IC, or Region 0 may be disposed in a first IC while Region 1 is disposed in a second IC and Region n is disposed in a third IC.

The PL blocks 425 in Region 1 and Region n can include any amount of programmable logic. Using the configuration information in the device image 105, the CIM circuits 405B and 405C can configure the PL blocks 425 to perform a user-defined function during operation.

The hard IP 430 can include any variety of hardened circuitry that is can be configured using the device image 105.

The data processing engine (DPE) segments 435 can include a plurality of DPEs which may be arranged in a grid, cluster, or checkerboard pattern in the device 400. Further, each DPE segment 435 can be any size and have any number of rows and columns formed by the DPEs. In one embodiment, the DPEs in the DPE segments 435 are identical. That is, each of the DPEs (also referred to as tiles or blocks) may have the same hardware components or circuitry. Further, the embodiments herein are not limited to DPEs. Instead, the device 400 can include an array of any kind of processing elements, for example, the DPEs could be digital signal processing engines, cryptographic engines, Forward Error Correction (FEC) engines, or other specialized hardware for performing one or more specialized tasks.

The chiplets 440 can be part of an anchor/chiplet arrangement as discussed above in FIG. 2A. For example, the CIM circuit 405B may be tasked with forwarding configuration information to the chiplet 440A while the CIM circuit 405C is tasked with forwarding configuration information to the chiplet 440B.

Having the stream engine 115 (e.g., the central configuration manager) involved in low-level data movement at the device level for configuration is inefficient in terms of performance and power. Thus, as discussed above, the stream engine 115 streams configuration information through the network (e.g., the NoC 415) to the CIM circuits 405 that are distributed across the device. By directly streaming the configuration information to the CIM circuits 405 using hardware, the stream engine 115 does not create a bottleneck. Also, the config packets (which make up the contiguous streams shown in FIG. 4) are transferred from the stream circuit to the CIM circuits 405 with maximal burst capabilities avoiding overloading the NoC 415 with many small independent memory transfers.

Figure 5:
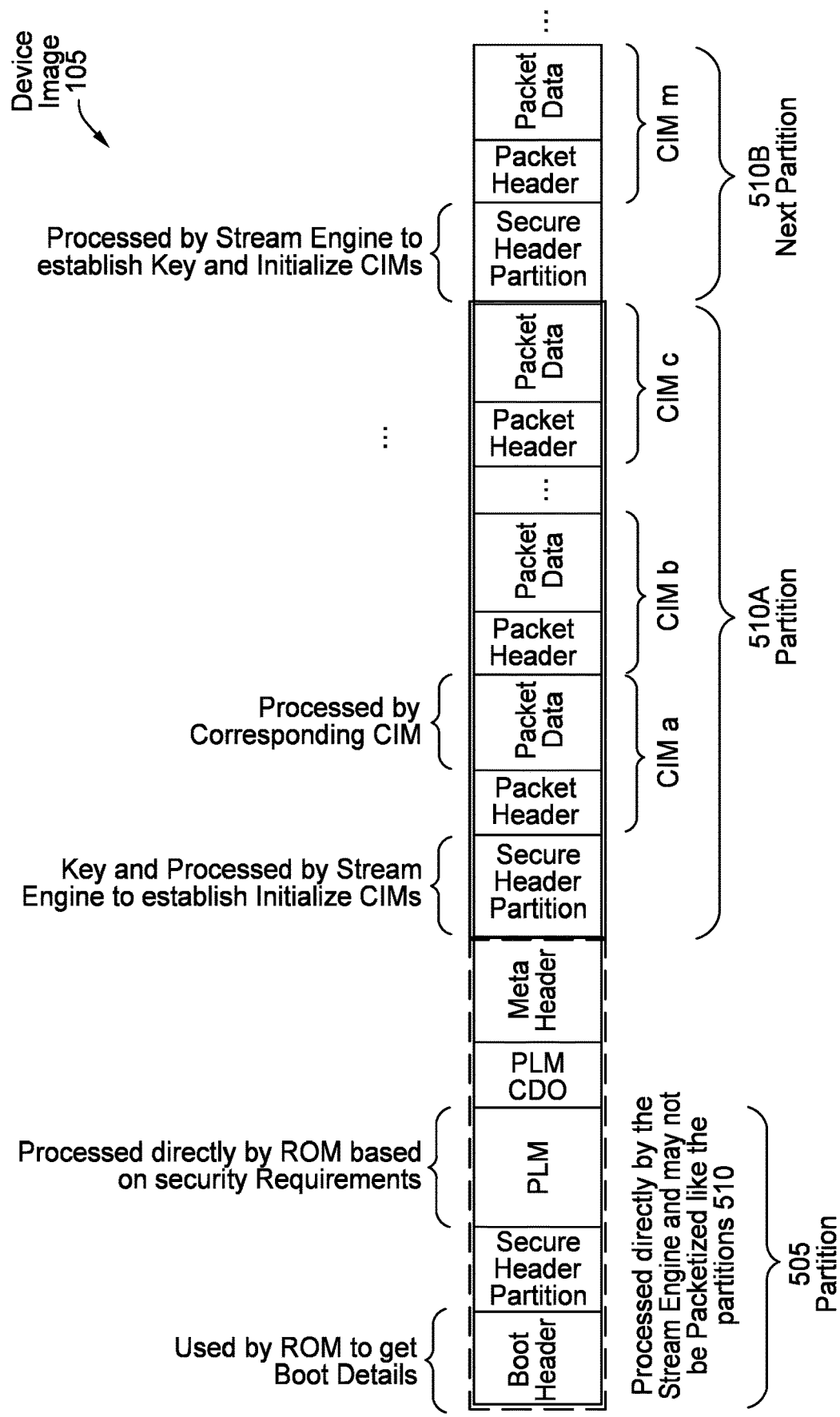
FIG. 5 illustrates a portion of a device image, according to an embodiment.

FIG. 5 illustrates a portion of the device image 105, according to an embodiment. FIG. 5 illustrates the high-level organization that can be used in the device image 105 for a configurable device. The image 105 includes a boot header and multiple programming partitions, where each partition is destined for a particular region in the configurable device. The boot header provides information used to authenticate the access to the device and to process the rest of the image 105, including its authentication and decryption.

The partition 505 in the device image 105 is the main partition that may always be present and includes the Platform Loader and Manager (PLM) firmware that executes on, for example the processor that also includes the stream circuit or the central configuration manager. In one embodiment, the main partition 505 is loaded by a read only memory (ROM) in the processor while the loading of the other partitions is done by the PLM firmware in conjunction with the CIM circuits.

In this example, each subsequent partition 510 includes a secure partition header that is processed by the stream circuit to establish keys and other configuration information used by the CIM circuits to process the partition. The remaining part of the partitions 510 is divided into multiple packets which the stream circuit routes to a specific CIM circuit (e.g., CIM a, CIM b, CIM c, etc.) for processing. The packet headers for the packets in the partitions 510 identify the target CIM circuit so the stream circuit knows the destination for each of the packets. In this manner, the stream circuit is able to packetize the data as discussed at block 315 in the method 300 and forward the packets to the specific CIM circuits.

Further, the packet data in each of the packets in the partitions 510 is then processed at the CIM circuits and not at the stream circuit. Thus, processing the configuration information in the data packets (and forwarding that configuration information to the specific circuit being configured) is delegated to the CIM circuits once the packets are received by those circuits.

Figure 6:
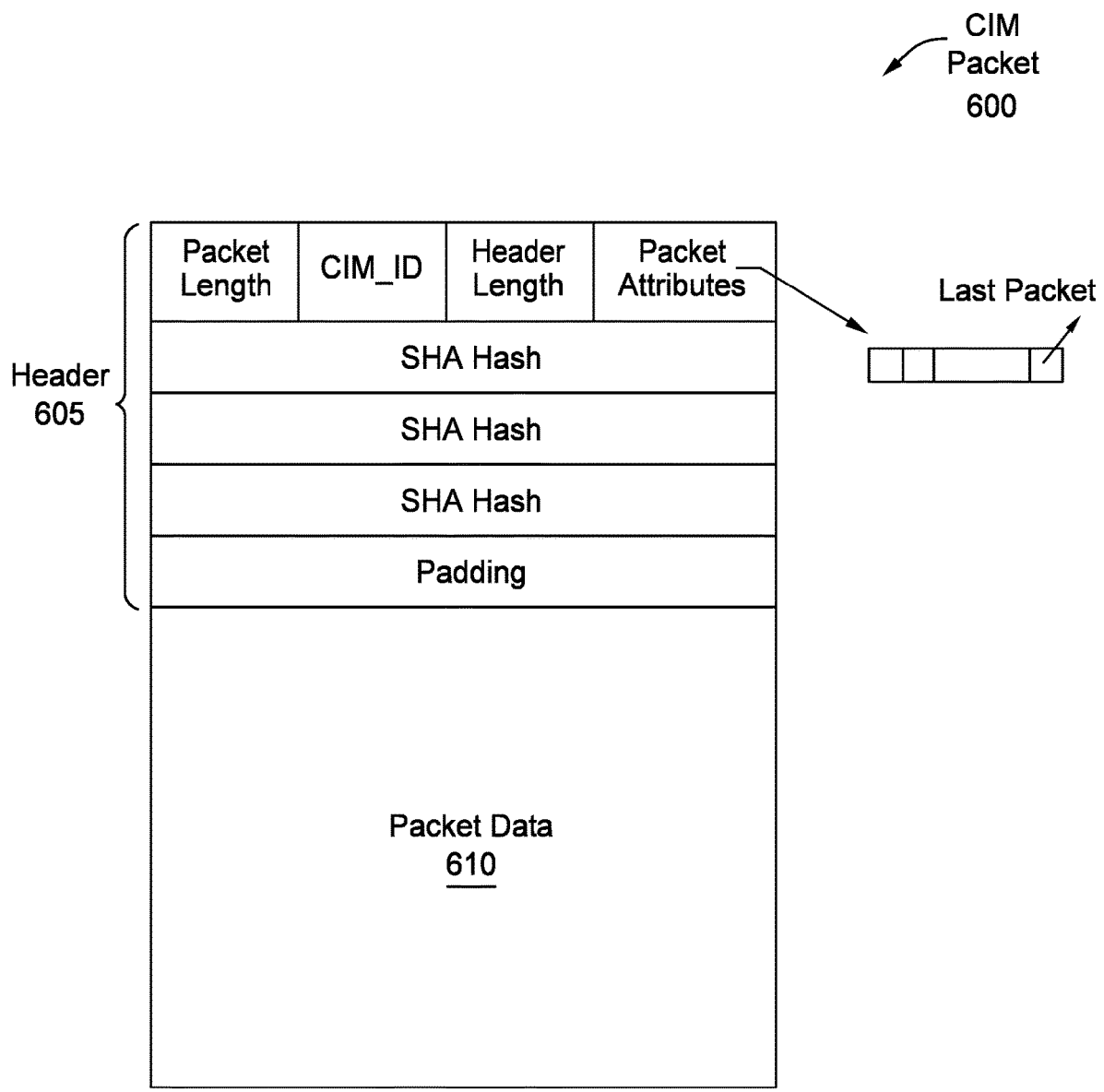
FIG. 6 illustrates a packet in a device image, according to an embodiment.

FIG. 6 illustrates a CIM packet 600 in a device image, according to an embodiment. That is, FIG. 6 illustrates an example format of the packets in the partitions 510 in FIG. 5. The CIM packet 600 is divided into a header 605 and a packet data 610 (i.e., a payload). The first quad-word in the CIM packet 600 specifies the target CIM (using a CIM ID), packet length, header length, and packet attributes.

In one embodiment, the length of the CIM packet 600 and the header 605 are always multiples of quad-words. Further, the least significant bit of the packet attribute can indicate whether the packet is the last packet in the partition that needs to be transferred using, e.g., direct memory access (DMA).

The packet header 605 also includes a SHA hash (e.g., or any other suitable cryptography element) for the next packet. The padding in the header 605 can be used to ensure the packet length satisfies the requirement for the SHA-3 architecture. The last packet in one of the partitions 510 in FIG. 5 may not include the SHA hash and padding since there is not a next packet in that partition 510.

In one embodiment, the CIM packets 600 is hashed in its entirety, which includes the header 605 and the payload—i.e., the packet data 610. In one embodiment, each CIM circuit includes sufficient internal storage to buffer at least two packets. Buffering the CIM packets 600 in the CIM circuits allows the CIM packets 600 to also be validated to ensure data integrity, as well as to be decrypted to ensure data privacy.

Figure 7:
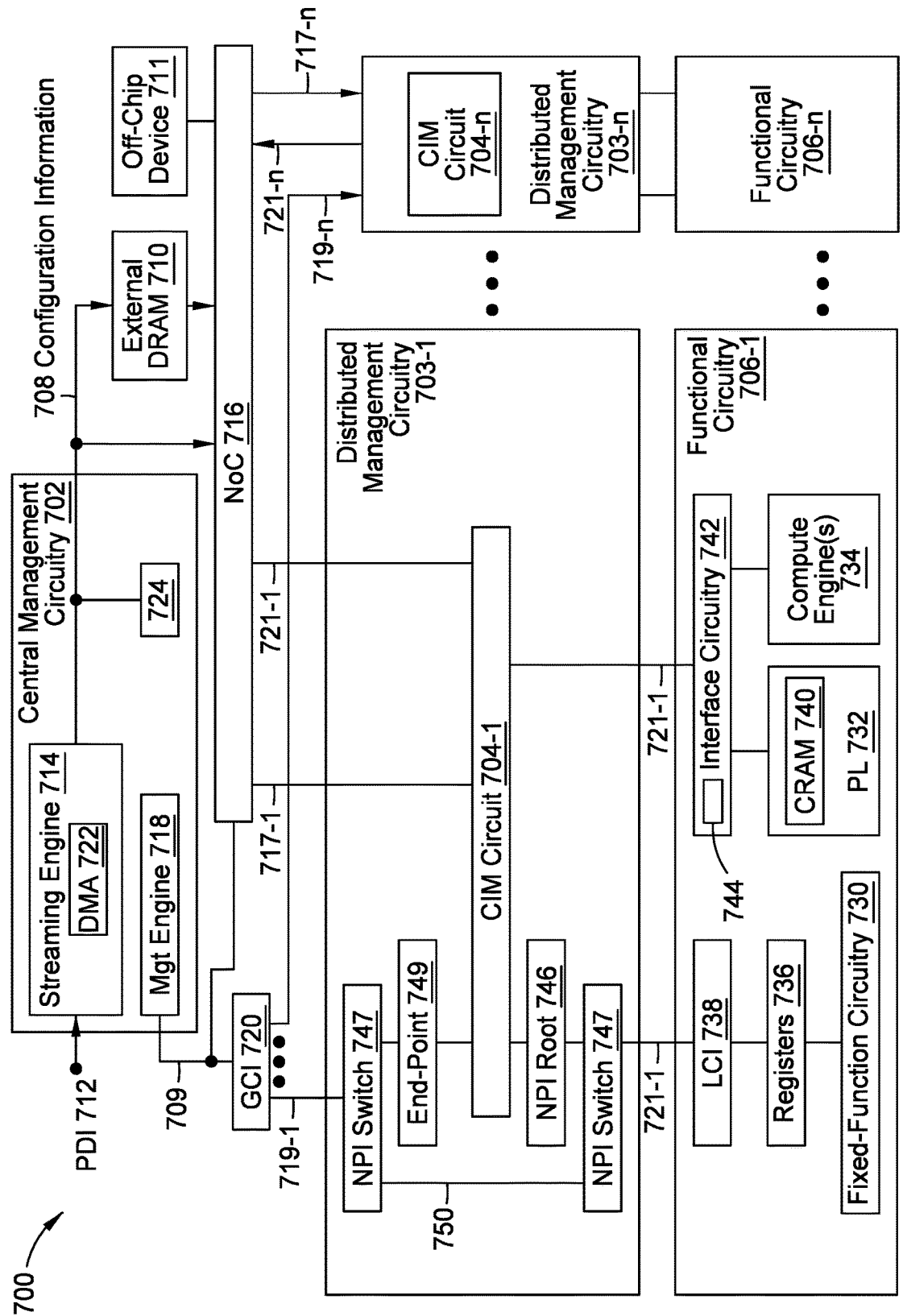
FIG. 7 is a block diagram of an IC device that includes functional circuitry, central management circuitry, and distributed management circuitry, according to an embodiment.

FIG. 7 is a block diagram of an integrated circuit (IC) device 700 that includes functional circuitry 706-1 through 706-*n* (collectively, functional circuitry 706), central management circuitry 702, and distributed management circuitry 703-1 through 703-*n* that include respective CIM circuits 704-1 through 704-*n* (collectively, CIM circuits 704), according to an embodiment. CIM circuits 704 may represent example embodiments of CIM circuits 130A and 130B in FIG. 1.

In the example of FIG. 7, functional circuitry 706-1 includes fixed-function circuitry 730 (e.g., non-programmable, or hardened circuitry, and/or application specific integrated circuitry (ASIC)), registers 736 that hold configuration parameters for fixed-function circuitry 730, and interface circuitry, illustrated here as local control interconnect (LCI) circuit 738, that interfaces between CIM circuit 704-1 and registers 736 over a link 739. A register 736 may, for example, control a multiplexer of fixed-function circuitry 730. Another register 736 may be used to store a status indicator (e.g., status indicator of a memory controller).

Functional circuitry 706-1 further includes one or more compute engines 734 (e.g., an array of artificial intelligence engines, or AIEs), and programmable circuitry, illustrated here as programmable logic (PL) 732. Compute engine(s) 734 may include registers and/or memory that are programmable for various functions). PL 732 includes configuration random access memory (CRAM) 740 that holds configuration parameters for configurable circuitry, or fabric of PL 732. Functional circuitry 706-1 further includes interface circuitry 742 that interfaces between CIM circuit 704-1 and PL 732 and compute engines 734 over one or more links 743. Interface circuitry 742 may include configuration frame interface (CFrame) circuitry 744 that interfaces between CIM circuit 704-1 and CRAM 740 over a CFrame programming bus.

LCI circuitry 738 and/or interface circuitry 742 may include configurable master/slave interface circuitry, such as on-chip communication bus protocol marketed as an Advanced extensible Interface (AXI), developed by Arm of Cambridge, England. LCI circuitry 738 may include registers and/or static random access memory (SRAM) that hold configuration parameters for LCI circuitry 738.

Functional circuitry 706-1 is not limited to the examples of FIG. 7.

CIM circuits 704 distribute configuration parameters to respective functional circuitry 706. The configuration parameters may relate to clocking, memory controllers, input/output (I/O) circuitry, transceivers, chiplets, and/or other features/functions. In the example of FIG. 7, CIM circuit 704-1 provides configuration parameters for interface circuitry 738 and registers 736 through a root bridge 746, a NoC peripheral interconnect (NPI) switch 748, and a link 739. CIM circuit 704-1 provides configuration parameters for PL 732, compute engines 734, and interface circuitry 742 over link(s) 743. In an embodiment, CIM circuit 704-1 also provides configuration parameters to an off-chip device 711 (e.g., a chiplet). CIM circuit 704-1 may, for example, push an image to off-chip device 711 via a chip-to-chip (C2C) interface, and the off-chip device may include an engine that performs self-configuration based on the image.

CIM circuits 704 may perform additional management functions (e.g., configuration, control, and/or debug functions) and/or data processing functions (e.g., integrity, authentication, and/or error detection) related to respective functional circuitry 706. CIM circuits 704 may perform one or more functions in-line, or in a pipeline fashion. CIM circuits 704 may execute commands, such as memory access commands. CIM circuits 704 may be useful to distribute management and/or data processing functions throughout IC device 700 (I.e., functions that might otherwise be performed by central management circuitry 702 and/or a host device). CIM circuits 704 may return data (e.g., readback data) to central management circuitry 702 via respective links 721-1 through 721-*n*. Example embodiments of CIM circuits 704 are provided further below.

In the example of FIG. 7, central management circuitry 702 includes a streaming engine 714 that distributes the configuration information 708 to CIM circuits 704 over a first communication channel. In an embodiment, configuration information 708 includes configuration packets, and the first communication channel includes a packet-switched network-on-chip (NoC) 716 and respective communication links 717-1 through 717-*n*. The first communication channel is not, however, limited to a NoC. Streaming engine 714 and PDI 712 may represent examples of stream engine 115 and PDI 105 in FIG. 1.

In an embodiment, PDI 712 includes a boot header and multiple programming partitions, such as described further above with reference to FIGS. 5 and 6. The first partition of PDI 712 may be a main partition that is always present and includes platform loader and manager (PLM) firmware that will run on a management engine 718 of central management circuitry 702. Central management circuitry 702 may load keys contained within secure headers of the partitions.

Where PDI 712 includes multiple programming partitions, the programming partitions may be in the form of packets targeted to respective CIM circuits 704 (e.g., the packets may include packet headers that identify the respective target CIM circuits 704). In this example, streaming engine 714 may distribute the packets to the respective CIM circuits 704 over NoC 716. The least significant bit of a packet attribute may signify to streaming engine 714 that the packet is the last packet in a partition to be transferred by streaming engine 714.

Streaming engine 714 may include a direct memory access (DMA) engine 722 that distributes the packets to CIM circuits 704 with maximal burst capabilities to avoid overloading NoC 716 with numerous small independent memory transfers. Using streaming engine 714 and associated hardware (e.g., NoC 716) to directly stream configuration information 708 to CIM circuits 704, rather than management engine 718, may be useful to avoid management engine 718 becoming a bottleneck. CIM circuits 704 extract configuration instructions and associated configuration parameters from the respective partitions, and distribute the configuration parameters to respective region of functional circuitry 706 based on the instructions.

Prior to distributing the programming partitions to CIM circuits 704 over NoC 716, central management circuitry 702 may configure CIM circuits 704 with initialization parameters 709 during an initialization or power-up phase over a second communication channel. In the example of FIG. 7, the second communication channel is a tree-type interconnect that includes a global control interconnect (GCI) circuit 720 rooted in central management circuitry 702, local control interconnect circuits rooted in respective distributed management circuitry 703, and respective links 719-1 through 719-*n*. The second communication channel may be based on a network-on-chip (NoC) peripheral interconnect (NPI) standard, or protocol. The second communication channel is not, however, limited to an NPI standard. After central management circuitry 702 configures CIM circuit 704-1, CIM circuit 704-1 is able to receive configuration packets from streaming engine 714 through NoC 716.

In the example of FIG. 7, distributed management circuitry 703-1 further includes a NPI switch 747 and end-point circuitry 749 that permit central management circuitry 702 to access and configure CIM circuit 704-1 through the second communication channel (e.g., through GCI circuit 720). Distributed management circuitry 703-1 further includes a NPI root bridge 746 and a NPI switch 748 to permit CIM circuit 704-1 to access LCI circuitry 738. Initialization parameters 709 may include parameters to configure NPI switches 747 and 748, end-point circuitry 749, and/or root bridge 746 during the initialization, or start-up phase.

In an embodiment, central management circuitry 702 may directly access registers 736 and/or other features of functional circuitry 706-1 via GCI circuit 720, link 719-1, NPI switch 747, a NPI bus 750, NPI switch 748, link 739, and LCI 738.

Initialization parameters 709 may further include parameters to configure GCI circuit 720 and NPI switches 747 and 748 to permit management engine 718 to directly access LCI circuitry 738 (e.g., to directly read a register 736). In this example, GCI circuit 720 and NPI switches 747 and 748 provide a transition from high-level LCI to lower level LCI, bypassing CIM circuit 704-1.

In the example of FIG. 7, switches 747 and 748 are illustrated as NoC peripheral interconnect (NPI) switch circuits, and root bridge 746 is illustrated as a NPI root. In this example, root bridge 746 may convert AXI-formatted transfers received from CIM circuit 704-1 to an NPI protocol. Switches 747 and 748 and root bridge 746 are not limited to NPI circuits.

Initialization parameters 709 may further include parameters to configure registers of NoC 716. Alternatively, or additionally, central management circuitry 702 may provide initialization parameters to NoC 716 as described below.

Central management circuitry 702 may further include a central CIM circuit 724 to off-load work from management engine 718 and/or a host device. In an embodiment, central CIM circuit 724 configures the second communication channel (i.e., NoC 716) during the initialization or power-up phase, based on configuration information 708. NoC 716 may include configurable switches and numerous non-contiguous registers, which may necessitate numerous write operations to program the non-contiguous registers. Using central CIM circuit 724 to configure NoC 716 may be useful to free up resources of management engine 718 or a host device for other purposes. Central CIM circuit 724 may also perform self-configuration based on configuration information 708. Central CIM circuit 724 may include features of CIM circuit 704-1, but may differ from CIM circuit 704-1 in one or more respects, examples of which are provided further below.

Central management circuitry 702 may push configuration information 708 (e.g., packetized partitions of PDI 712) to CIM circuits 704 through NoC 716, such as described above. Alternatively, or additionally, central management circuitry 702 may store configuration information 708 in external memory, illustrated here as external DRAM 710, and provide memory location information to CIM circuits 704 to permit CIM circuits 704 to retrieve, or pull configuration information 708 from DRAM 710. As an example, during an initialization or start-up phase, CIM circuits 704 may receive configuration information 708 directly from central management circuitry 702 through NoC 716 to configure respective functional circuitry 706. Thereafter, a CIM circuit 704 may retrieve additional configuration information 708 from DRAM 710, through NoC 716, to reconfigure or partially reconfigure the respective functional circuitry 706. For partial reconfiguration of a region, it may be more efficient to have CIM circuit 704-1 retrieve configuration parameters from external memory.

External DRAM 710 may include one or more libraries of reconfiguration or partial reconfiguration instructions and associated configuration parameters for various tasks. A library may include, for example, instructions and parameters to configure a region of PL 732 as an accelerator circuit. When functional circuitry 706-1 is assigned a task (e.g., by a host device/data center), CIM circuit 704-1 may retrieve an appropriate library of reconfiguration instructions and parameters from external DRAM 710.

In an embodiment, CIM circuit reconfigures or partially reconfigures functional circuitry 706-1 by writing to registers 736 through interface circuitry 738 to reconfigure or partially reconfigure fixed-function circuitry 730, writing to CRAM 740 through Cframe circuitry 744, and/or writing to registers and/or memory of compute engines 734 through interface circuitry 742. Alternatively, or additionally, central management circuitry 702 provides reconfiguration or partial reconfiguration parameters for interface circuitry 738 and/or registers 736 directly to interface circuitry 738 via GCR 720 and switches 747 and 748.

Figure 8:
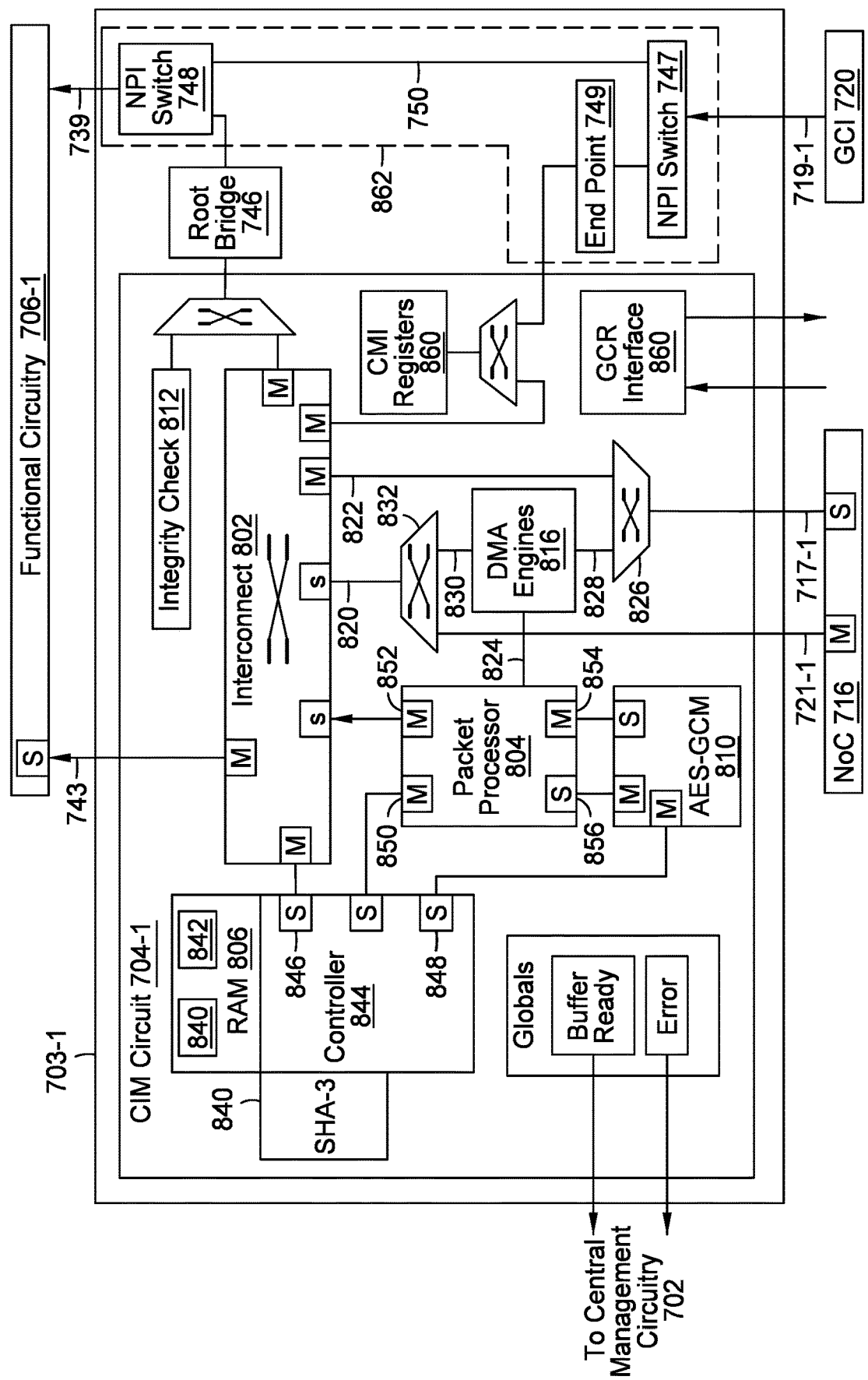
FIG. 8 is a block diagram of the distributed management circuitry, according to an embodiment.

FIG. 8 is a block diagram of distributed management circuitry 703-1, according to an embodiment. Remaining distributed management circuitry 703 may be similar to distributed management circuitry 703-1.

In the example of FIG. 8, CIM circuit 704-1 includes a CIM interconnect 802 that interfaces amongst resources/circuitry within CIM circuit 704-1, and with circuitry that is external to CIM circuit 704-1.

In FIG. 8, CIM interconnect 802 includes master and slave ports, illustrated here as "M" and "S", respectively. The master and slave ports may represent AXI master and slave ports. CIM interconnect 802 is not limited to master and slave ports, or AXI interfaces.

CIM circuit 704-1 further includes a packet processor 804 that parses commands from packets received from NoC 716 and/or from external DRAM 710, and executes the commands on target interfaces.

CIM circuit 704-1 further includes random access memory (RAM) 806. RAM 806 may include packet buffers 840 that hold incoming packets to be processed by packet processor 804, and data buffers 842 that hold data associated with commands executing on packet processor 804 (e.g., stream data that is read or is expected to be written by commands executing on packet processor 804).

In an embodiment, packet buffers 840 contain two slots and each slot can hold a packet. This allows one packet to be pushed into CIM circuit 704-1 while CIM circuit 704-1 is processing another packet. A packet may be stored in each slot in its entirety including its header. A remaining portion of RAM 806 may be used for data buffers 842 to hold intermediate data that is read back or being processed. In an embodiment, packet processor 804 may execute commands that can use a specific data buffer 842 as a source or destination.

CIM circuit 704-1 further includes a memory controller 844. Memory controller 844 includes a first slave port 846 that is accessible to CIM interconnect 802, and a second slave port 848 that is accessible to packet processor 804 to fetch commands.

CIM circuit 704-1 further includes inline decryption circuitry, illustrated here as AES-GCM circuitry 810 (i.e., Advanced Encryption Standard Galois/Counter Mode), that decrypts configuration packets before packet processor 804 processes the configuration packets. In an embodiment, packet processor 804 fetches configuration packets from packet buffer 840 and parses the configuration packets for commands to be executed by packet processor 804. If the configuration packets is encrypted, packet processor routes the configuration packet into and out of AES-GCM circuitry 810. Packet processor 804 may control AES-GCM circuitry 810, which may be useful/efficient for encryption key rolling. Packet processor 804 may roll an encryption key of AES-GCM circuitry 810, in conjunction with AES-GCM circuitry 810.

CIM circuit 704-1 further includes integrity checking circuitry 812 that reads configuration registers within functional circuitry 706-1 and performs error correction code (ECC) checks.

CIM circuit 704-1 further includes global communication ring (GCR) interface circuitry 814 that serves as a node or an interface to a GCR interconnect. In an embodiment, GCR interface circuitry 814 captures data (e.g., eFuse information) sent by central management circuitry 702, and communicates error/interrupt packets on the GCR to central management circuitry 702. In an embodiment, packet processor 804 may use GCR interface circuitry 814 to communicate with central management circuitry 702 and/or other GCR nodes.

Features illustrated within block 862, and link 743, may be omitted from central CIM circuit 724 (FIG. 7).

CIM circuit 704-1 further includes DMA engines 816 that stream commands and data to and from CIM circuit 704-1. DMA engines 816 are described further below with reference to FIGS. 9A and 9B.

CIM circuit 704-1 further includes authentication circuitry that authenticates configuration packets received from central management circuitry 702 and external DRAM 710, before packet processor 804 processes the configuration packets. The authentication circuitry may implement a secure hash algorithm (SHA) published by the U.S. National Institute of Standards and Technology (NIST). In the example of FIG. 7, the authentication circuitry is illustrated as SHA-3 circuitry 808. Central management circuitry 702 and/or distributed management circuitry 703-1 may be programmed to push a packet to SHA-3 circuitry 808 when the packet is pushed or pulled to distributed management circuitry 703-1.

In an embodiment, central management circuitry 702 provides an expected hash value for a first packet to distributed management circuitry 703-1 during an initialization phase, and headers of configuration packets include SHA hash values (e.g., in 3 quadwords of the header) for respective subsequent packets. The packet headers may also include padding to provide a packet length suitable for SHA-3 circuitry 808. DMA engines 816 may automatically load the SHA hash value contained in a header to SHA-3 circuitry 808 for authentication of a subsequent packet.

When the first packet is read into a packet buffer 840, SHA-3 circuitry 808 computes a hash value based on the first packet to provide a SHA digest, and compares the SHA digest to the hash value provided by central management circuitry 702. If the SHA digest matches the hash value provided by central management circuitry 702, packet processor 804 may process the packet. DMA engines 816 may store a hash value contained in the header of the first packet for use with a subsequent packet.

When the subsequent packet is read into a packet buffer 840, SHA-3 circuitry 808 computes a hash value based on the packet to provide a SHA digest and compares the SHA digest to the stored hash value obtained from the preceding packet. If the SHA digest matches the stored hash value, packet processor 804 may process the packet. If the SHA digest does not match the hash value for the packet, DMA engines 816 or packet processor 804 may send an error message/interrupt to central management circuitry 702, central management circuitry 702 may stall packet streaming to distributed management circuitry 703-1.

In an embodiment, a packet buffer 840 is marked as full when a packet is read into the packet buffer 840. If the SHA digest matches the hash value for the packet, the packet buffer 840 is marked available. DMA engines 816 may halt processing of packets until the packet buffer 840 is marked available.

The process of comparing a hash of the first packet to a hash value provided by central management circuitry 702, and comparing hash value of a subsequent packet to a hash value parsed from a preceding packet, as described above, inherently authenticates/validates the SHA hash for the subsequent packet.

Packet processor 804 may include one or more local registers, which may include, without limitation, a local data register (LDR), a control register, and/or a condition register (CR). In an embodiment, packet processor 804 includes a 16-bit control register (e.g., 16 1-bit registers, which may be represented as Control_Reg[15:0]), and a 16-bit CR (e.g., 16 1-bit CRs, which may be represented as Condition_Reg[15:0]). The local registers may be useful to provide low-latency controls. Packet processor 804 may access (retrieve a value from and/or write to) a local register during execution of one or more of a variety of types of commands. Packet processor 804 may, for example, selectively execute a predicated command based on a condition, or value of a CR bit. Additional examples are provided further below.

In FIG. 8, packet processor 804 includes a command fetch port 850, a data execution port 852, an AES master port 854, an AES slave port 856, and a DMA read FIFO (first-in/first-out) buffer port 858, which are described below.

Packet processor 804 uses command fetch port 850 to interface with memory controller 844, such as to read a packet that has been validated by SHA-3 circuitry 808. In an embodiment, command fetch port 850 includes a dedicated AXI interface (e.g., a 128-bit AXI interface) that reads (e.g., 128-bit reads) from a starting address until the end of a packet is reached. Packet processor 804 may determine packet length at the beginning of a packet header, and may determine when to stop fetching commands based on the packet length.

Packet processor 804 uses data execution port 852 (e.g., a 128-bit AXI master interface) to execute various types of read and write transactions (e.g., AXI transactions) through CIM interconnect 802. The type of the transaction, including length and width of the transaction is defined by commands embedded within a packet. Data for a read operations may be forwarded to specific registers in command engine 902, or to a specific offset of a data buffer 842. A base address of the data buffer 842 may be determined by a buffer translation table of packet processor 804.

Packet processor 804 uses AES master port 854 (e.g., a 128-bit write-only master interface) to direct packets that are read from data buffer 842, to AES-GCM circuitry 810.

AES-GCM circuitry 810 pushes write transactions to an input FIFO buffer of packet processor 804 through AES slave port 856 (e.g., a 128-bit slave interface). Packet processor 804 parses commands that are included in the inbound stream, and may create back-pressure when appropriate (i.e., AES slave port 856 will not be able to receive additional commands until there is room in the FIFO buffer of packet processor 804).

Packet processor 804 uses DMA read FIFO buffer port 858 (e.g., a 128-bit path) to push readback data from a read pipeline of packet processor 804 to DMA engines 816, such as described further below with reference to FIGS. 9A and 9B. Packet processor 804 may read data from multiple locations (e.g., to gather trace data), and may push the readback data to DMA engines 816, DMA engines 816 may transfer or stream the readback data to memory (e.g., to RAM 806 or external DRAM 710). DMA engines 816 may be useful to free packet processor 804 to perform other functions.

Figure 9A:
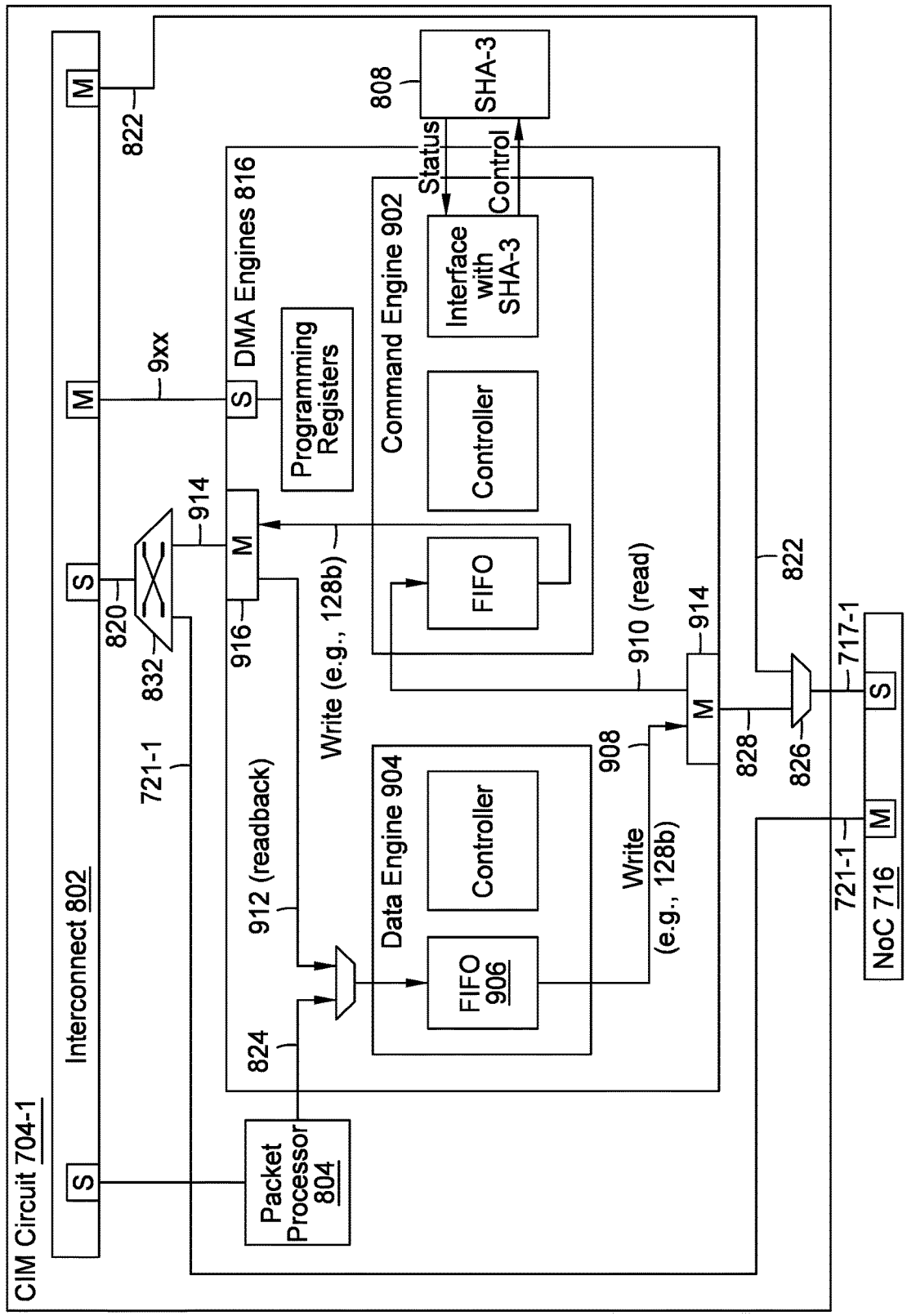
FIG. 9A is a block diagram of DMA engines of the distributed management circuitry, including a command engine and a data engine, according to an embodiment.

FIG. 9A is a block diagram of DMA engines 816, including a command engine 902 and a data engine 904, according to an embodiment.

Command engine 902 pulls configuration packets 910 from DRAM 710 (e.g., for reconfiguration/partial reconfiguration). Command engine 902 may read configuration packets 910, and push configuration packets 910 to CIM interconnect 802 for delivery to packet buffer 840. Command engine 902 may extract commands from configuration packets 910 for execution by packet processor 804.

Data engine 904 pushes readback data 912 (from functional circuitry 706-1) to a storage device, such as external DRAM 710 or fabric buffers of PL 732. Readback is discussed further below. Data engine 904 may be programmed/configured to perform other tasks, such as transfers. Data engine 904 may operate under control of packet processor 804.

Command engine 902 and data engine 904 may operate in parallel with one another. For example, command engine 902 may read, or pull configuration packets 910 from external DRAM 710 and copy command packets to packet buffers 840 in RAM 806, while data engine 904 pushes readback data 912 received from CIM interconnect 802 or packets received from packet processor 804 over link 824 to NoC 716.

DMA engines 816 may operate in one or more of a variety of modes, examples of which are provided below for a direct configuration mode, a direct fabric read-back mode, and a support mode.

In the direct configuration mode, command engine 902 is programmed to stream packets from a contiguous region of external DRAM 710 to packet buffers 840. In an embodiment, command engine 902 inspects the least-significant bit of an attributes word in a first quadword of a current packet to determine if the current packet is the last packet to be transferred. If the current packet is the last packet to be transferred, command engine 902 stops transferring packets after the current packet is read.

In the direct fabric read-back mode, packet processor 804 initiates readback of data within functional circuitry 706-1 (e.g., within PL 732), and data engine 904 streams resultant readback data 912 to memory (e.g., to data buffers 842 or external DRAM 710). In an embodiment, packet processor 804 performs a readback operation by pushing a write command to data engine 904, and data engine 904 pulls the data from functional circuitry 706-1. Packet processor 804 or data engine 904 may push the write command to CFrame circuitry 744 to write the contents of a register or memory location within PL 732 or CRAM 740 onto link(s) 743. Data engine 904 may issue read commands to a keyhole, or fixed aperture of CFrame circuitry 744, and may steer resultant readback data to NoC 716 through DMA switch 828.

After packet processor 804 completes writing readback commands to CFrame circuitry 744, packet processor 804 may write to a control register of data engine 904 to indicate that data engine 904 is to complete any outstanding reads from CFrame circuitry 744. Packet processor 804 may directly read residual data in a FIFO buffer of CFrame circuitry 744, and may push the residual data to a read FIFO buffer 906 of data engine 904, such as described below with respect to a support mode.

Packet processor 804 may perform data readback for one or more of a variety of purposes, such as conditional commands, data processing, integrity checking, and/or capturing state (e.g., for emulation purposes).

For conditional commands, packet processor 804 may readback contents of a register within functional circuitry 706-1 (e.g., a register within PL 732) to determine whether to execute a command.

For data processing, packet processor 804 may instruct DMA engines 816 to place data in a first one of data buffers 842. Packet processor 804 may then read (i.e., readback) the data from the first data buffer, process the data, write the processed data to a second one of data buffers 842, and instruct DMA engines 816 to empty the second buffer.

For integrity checking, packet processor 804 may readback configuration parameters from registers or memory (e.g., CRAM 740) of functional circuitry 706 through configuration circuitry (e.g., over links 739 and/or 743), and compare the readback data to configuration parameters that were previously provided to the registers or memory.

For emulation, packet processor 804 may save an operating state of functional circuitry 706-1, or a portion thereof, and subsequently configure functional circuitry 706-1, or the portion thereof, with the saved state (e.g., for debug purposes). In an embodiment, packet processor 804, or other circuitry, halts a clock of functional circuitry 706-1, and packet processor 804 reads contents of configuration registers/memory of functional circuitry 706-1 through configuration circuitry (e.g., links 739 and/or 743). The contents represent a saved state of functional circuitry 706-1, or a portion thereof. Thereafter, packet processor 804 may configure functional circuitry 706-1 with the saved state, through the configuration infrastructure. Alternatively, or additionally, functional circuitry 706-1 may include test/debug infrastructure to read registers (e.g., chip scope), and/or flip-flops (e.g., scantest). In this embodiment, packet processor 804 may readback a state of the registers and/or flip-flops through the test/debug infrastructure. Thereafter, packet processor 804 may configure functional circuitry 706-1 with the saved state, through the test/debug infrastructure.

In the support mode, data engine 904 supports packet processor 804 in performing DMA read operations. When packet processor 804 performs a read DMA operation, packet processor 804 pushes resultant data to read FIFO buffer 906 of data engine 904 over link 824 (e.g., a read pipeline of packet processor 804). Data engine 904 may stream, or write the data from read FIFO buffer 906 to a contiguous region of external DRAM 710 via a link 908, DMA switch 826, and NoC 716. In an embodiment, data engine 904 is programmed with a starting, or base address within a region of external DRAM 710, and increments the address with each write operation until data engine 904 is programmed with a new base address.

Further regarding slots of packet buffers 840, data engine 904 may mark the final transaction associated with a packet to notify packet processor 804 that the packet is complete, and a busy flag of the associated slot of packet buffer 840 may be set to identify the slot as full. If the other slot(s) of packet buffer 840 is/are still being used by packet processor 804 (i.e., busy flag is set), data engine 904 may hall pushing of packets to packet buffers 840. Busy flags may be routed throughout IC device 700 (e.g., to DMA engines of other distributed management circuitry 703 via central management circuitry 702).

In an embodiment, packet processor 804 and DMA data engine 904 are configured to read and push data to data buffers 842, which may be configured in RAM 806 with commands. The size and base address of data buffers 842, and configuration parameters (e.g., circular buffer, fixed FIFO, or LIFO) of data buffers 842 may be programmed into a data buffer management table (DBMT) of packet processor 804, such as described below with reference to FIG. 9B.

Figure 9B:
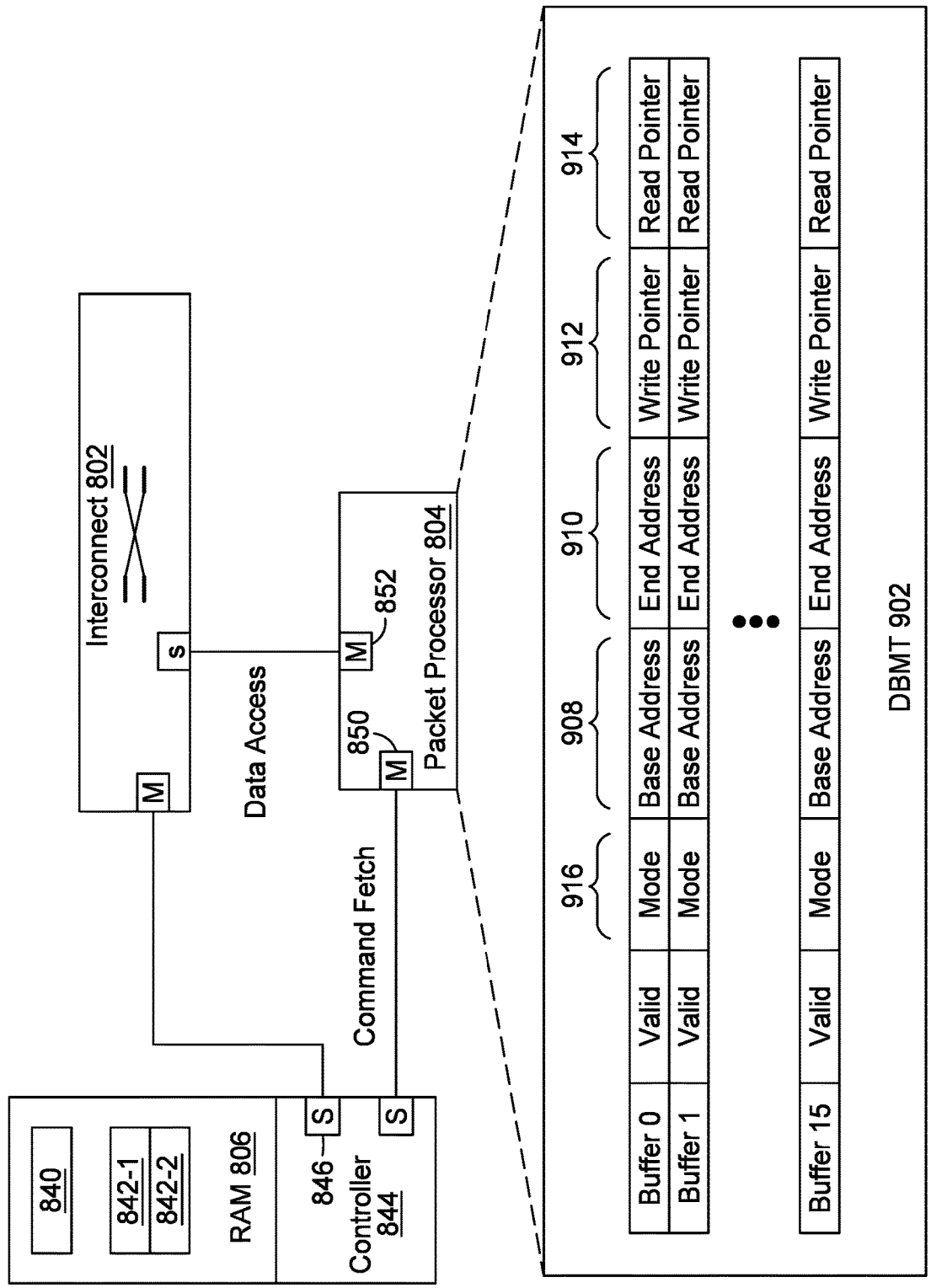
FIG. 9B illustrates a data buffer management table (DBMT) of a packet processor of the distributed management circuitry, and interconnections amongst the packet processor, a memory controller, and an interconnect of the distributed management circuitry, according to an embodiment.

FIG. 9B illustrates a DBMT 920 of packet processor 804, and interconnections amongst packet processor 804, memory controller 844, and interconnect 802, according to an embodiment. In the example of FIG. 9B, DBMT 920 supports up to 16 data buffers 842. In the example of FIG. 9B, entries of DBMT 902 include a base address field 908, an end address field 910, a write pointer field 912, a read pointer field 914, and a buffer mode field 916, which are described further below.

Commands that use data buffers 842 as source or destination may include a field (e.g., a 4-bit field) that specifies which data buffer 842 to use, examples of which are provided further below. In an embodiment, multiple operations of packet processor 804 can push data into and out of the same data buffer 842 in the order in which the operations are executing. DBMT 902 may maintain the level of data in the data buffer 804, and read and write pointers and for the operations.

Base address field 908 contains a lower address of a data buffer 842.

End address field 910 contains the upper address of the data buffer 842.

Write pointer field 912 contains the address of the next entry that can be written into a data buffer 842. When a specific data buffer 842 is programmed into DBMT 902, write pointer field 912 will be equal to the value in base address field 908.

Read pointer field 914 contains the address of the last entry that was read from a data buffer 842. When a specific data buffer is programmed into DBMT 902, read pointer field 914 will be equal to a value in end address field 910 for FIFO options, and will be equal to the value in base address field 908 for LIFO options.

Buffer mode field 916 contains a usage mode of the data buffer 842 (e.g., fixed FIFO, circular buffer, or LIFO).

Packet processor 804 may execute one or more of a variety of types of commands. Example command types, or categories include, without limitation, write commands, register read commands, register mask-and-write commands, compare commands, data buffer commands, and read-through DMA commands.

Write commands allow packet processor 804 to perform single and/or burst write operations (e.g., up to 256×128-bit). Data to be written may be specified in a write command. Packet processor 804 may direct a write command to one or more slave interface circuits of CIM interconnect 802. A write command may be predicated on a condition of a specified CR bit.

Register read commands allow packet processor 804 to read word, doubleword, and/or quadword values from an address on CIM interconnect 802 to the LDR of packet processor 804. Packet processor 804 may manipulate the value in the LDR and write the manipulated value to a slave interface circuit of CIM interconnect 802 and/or to CIM registers 860. A register read command may be predicated on a condition of a specified CR bit.

Register mask-and-write commands allow packet processor 804 to write word, doubleword, and/or quadword values from the LDR to a slave interface circuit of CIM interconnect 802. For register word operations, arbitrary bits in the least significant word of the LDR may be forced to 1 or 0 and written to the destination. A register mask-and-write command may be predicated on a condition of a specified Condition register bit.

Compare commands allow packet processor 804 to compare the least significant word of the LDR to a comparison value. A compare command may cause packet processor 804 to mask bits with a specified mask (e.g., a 32-bit mask), and compare the masked bits to a comparison value (e.g., a 32-bit value). If masked bits match the comparison value, packet processor 804 may set a specified CR bit.

Data buffer commands may include a read and/or write commands. Data buffer commands allow packet processor 804 to push data to or from a specified data buffer 842 (e.g., to the LDR or to external DRAM 710). A data buffer command may push word, doubleword, or quadword data. Data buffer commands may support burst read from a specified data buffer 842 to a location external to CIM circuit 704-1, such as by pushing the read data to read FIFO buffer 906 of data engine 904 for transfer to the external location (e.g., external DRAM 710). A data buffer command may be predicated on a condition of a specified CR bit.

Read-through DMA commands allow a read operation of varying size to be sent to/through CIM interconnect 802. A read-through DMA command may be used to perform a read operation from a specified data buffer 842. Read data may be pushed to read FIFO buffer 906 of data engine 904 for transfer to memory (e.g., data buffers 842 or external DRAM 710). A read-through DMA command may be predicated on a condition of a specified CR bit.

Commands executed by packet processor 804 may have one or more properties described below.

A command may start and stop on quadword boundaries.
A command may be between 1 and 257 quadwords long.
Word and doubleword writes may be specified in a single quadword.
A quadword read may be specified in a single quadword.
A quadword writes may be specified with commands that are two or more quadwords long. Command specifics, including command length and address, may be defined in a first quadword, and data to be written may be specified in subsequent quadwords.
A lower portion of an address (e.g., the lower 32 bits) may be specified in a first quadword. An upper portion of the address (e.g., the upper 32-bits) may be specified in a register (e.g., a CIM Upper_Address register), and may be used throughout a context of the associated command(s).
Readback data may be pushed to the read FIFO buffer 906 or may be retained in the LDR.
Data for a write operation may be sourced from the LDR or may be specified in the associated command.
Masking/checks may be performed on local registers of packet processor 804. For example, masking/checks may be performed on the LDR, and another local register(s) (e.g., a bit of the CR of packet processor 804) may be set based on the LDR.
Conditional/predicated execution may be performed based on a state of a Condition register bit.

Example instruction fields and formatting are described below.

Figure 10:
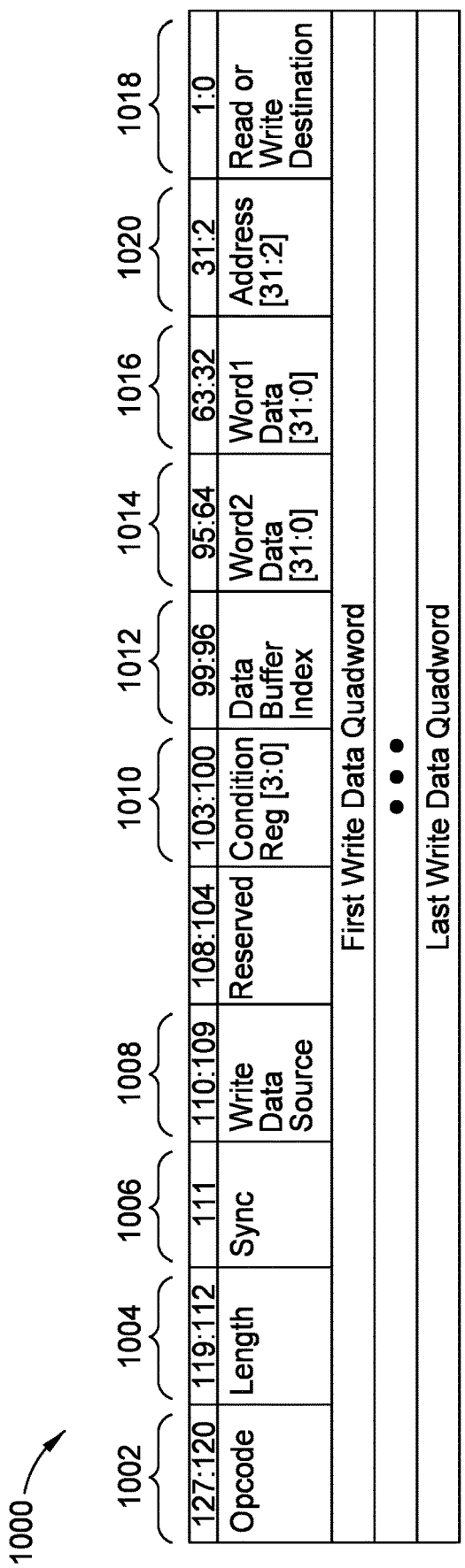
FIG. 10 illustrates fields for commands executed by a packet processor of the distributed management circuitry, according to an embodiment.

FIG. 10 illustrates fields 1000 for commands executed by packet processor 804, according to an embodiment. Fields 1000 includes an opcode field 1002, a length field 1004, a sync field 1006, a write data source field 1008, a condition register field 1010, a data buffer index field 1012, a word2 data field 1014, a word1 data field 1016, and address field 1020, and a read or write destination field 1018.

Figure 11:
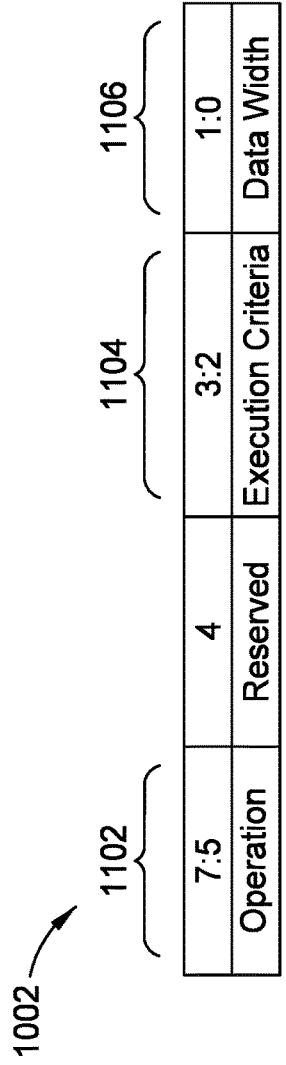
FIG. 11 illustrates subfields of an opcode field of FIG. 10, according to an embodiment.

FIG. 11 illustrates subfields of opcode field 1002, according to an embodiment. In the example of FIG. 11, opcode field 1002 is illustrated as an 8-bit field that includes an operation type, or class field 1102, an execution criteria field 1104, and a data width field 1106.

Example operation class codes are provided in the following table.

| Class Codes | Operation Class |
|---|---|
| 000 | Write Operation |
| 001 | Mask and Write Operation |
| 010 | Read Operation |
| 011 | Read and Mask Operation |
| 100 | Compare Operation |

Execution criteria field 1104 specifies whether a command is predicated, and predication parameters. Example execution criteria codes are provided in the following table.

| Execution Criteria Codes | Description |
|---|---|
| 00 | No predication (command will always execute) |
| 01 | Command replay for a poll instruction. A maximum number of replays may be specified in a register. |
| 10 | Command will execute if a flag specified by the CR is true |
| 11 | Command will execute if a flag specified by the CR is false |

Data width field 1106 specifies a width of an operation. Example data width codes are provided in the following table.

| Class Codes | Description |
|---|---|
| 00 | 32-bit operation |
| 01 | 64-bit operation |
| 10 | 128-bit operation |
| 11 | No operation |

Returning to FIG. 10, length field 1004 specifies the length of a write or read quadword burst. For write quadword bursts, length field 1004 may also indicate the number of the quadwords that will follow the first quadword in the write command, minus 1.

Sync field 1006 indicates when the associated command is synchronizing, and stops issuing of further commands by packet processor 804 until the command is completed. Synchronizing commands may return a status to a CR to indicate successful completion. A value of zero may indicate that the command is not synchronizing. A value of one may indicate that the command is synchronizing.

A synchronizing command is a type of command that stalls issuance of further commands until the synchronizing command is has completed. Normally, a CIM can issue non-synchronizing commands on its AXI interfaces back-to-back. The back-to-back non-synchronizing commands are handled in a pipeline fashion. When a CIM issues a synchronizing command on an AXI interface, the CIM will not issue further commands until it receives an indication on that AXI interface that that synchronizing command has completed.

Write data source field 1008 specifies whether data for a write operation is included in the associated command or is to be sourced from local registers of packet processor 804. Example source codes are provided in the following table.

| Source Codes | Description |
| --- | --- |
| 0X | Write data is specified in the command |
| 10 | Write data is sourced from the LDR of packet processor 804 |
| 11 | Write data is to be obtained/sourced from other local registers of packet processor 804 (e.g., CRs and/or control registers: e.g., bits 15:0 may be sourced from CRs [15:0], and bits 31:16 may be sourced from control registers [15:0]). |

Condition register (CR) field 1010 specifies a CR bit to be used for execution of an associated command. In the example of FIG. 10, CR field 1010 includes 3 bits to specify one of 16 CR bits.

Data buffer index field 1012 specifies an index of data buffers 842 that is used to lookup information in DBMT 902 (FIG. 9B) (. Packet processor 804 may use the information to write data in a data buffer 842 from the LDR, or to read data that is stored in a data buffer 842 and copy the data to the LDR or pass the data to read FIFO buffer 906.

Regarding word1 data field 1016 and word2 data field 1014, for a single word (e.g., 32 bit word) write operation, word1 data field 1016 contains data (e.g., 32 bits) to be written, and word2 data field 1014 is unused. For a doubleword write operation, word1 data field 1016 contains a lower portion, or word of the data to be written, and word2 data field 1014 contains an upper portion, or word of the data to be written (e.g., 32 bits).

For a mask store operation (e.g., in which data is sourced from bits [31:0] of the LDR), word1 data field 1016 contains a mask (i.e., specifying bits of the sourced data that are to be masked), and word2 data field 1014 contains values for the bits that are specified by the mask in word1 data field 1016. In other words, any of bits [31:0] of the LDR that are not masked by the value in word1 data field 1016 will be set to the values specified in respective bits of word2 data field 1014. For example, if bit 0 of the LDR is not masked, as specified by the value of bit 0 of word1 data field 1016, bit 0 of bits [31:0] of the LDR is set to the value of bit 0 of word2 data field 1014.

Regarding read or write destination field (destination field) 1018, for read commands, destination field 1018 specifies whether data that is read or masked by the read operation is to be pushed to read FIFO buffer 906 or stored in a local register of packet processor 804. For single-beat reads from memory, the data may be pushed to a local register of packet processor 804 by default. Example source/destination codes for read commands are provided in the following table.

| Source/Destination Codes | Description |
| --- | --- |
| 00 | Data from a memory read is to be copied to the LDR |
| 01 | Data from a memory read is to be copied to read FIFO buffer 906 |
| 10 | Data from a data buffer 842 is to be copied to the LDR |
| 11 | Data from a data buffer 842 is to be copied to read FIFO buffer 906 |

For write commands, destination field 1018 specifies whether write data (word/doubleword/quadword) is to be written to memory (e.g., external DRAM 710), data buffers 842, or a local register of packet processor 804. Example destination codes for write commands are provided in the following table.

| Destination Codes | Description |
| --- | --- |
| 00 | Memory write |
| 01 | Write to a data buffer 842 specified in data buffer index field 1012 |
| 10 | Write to the LDR |
| 11 | Write to the control register and the CR (e.g., bits 15:0 are copied to the condition register, and bits 31:16 are copied to the CR). |

Commands for packet processor 804 may be constructed by selecting appropriate encoding for fields illustrated in FIGS. 10 and 11. An example is provided below for a poll command to read a read a 32-bit value from a memory-mapped register and, if certain bits do not match with a specified value, to reissue, or repeat the poll command.

| Field | Value | Description |
| --- | --- | --- |
| Opcode 1002, Operation 1102 | | Read and mask |
| Opcode 1002, Execution Criteria 1104 | | Replay |
| Opcode 1002, Data Width 1106 | | 32-bit operation |
| Length 1004 | 8'h0 | Single word |
| Sync 1006 | 1 | Command is synchronizing |
| Write Data Source 1008 | 00 | Not applicable |
| Read or Write Destination 1018 | 00 | Copy read data in LDR |
| Condition Register 1010 | user choice | Condition register that logs possible error |
| Data Buffer Index | | Not applicable |
| Word1 Data | user choice | Value to compare against |
| Word2 Data | user choice | Mask |

Example commands for packet processor 804 are presented below.

FIG. 12 illustrates an example memory word write (MWW) command 1200 that allows packet processor 804 to write a value to a bit-aligned address (e.g., to write a 32-bit value to a 32-bit-aligned address) in a memory map of CIM circuit 704-1.

FIG. 13 illustrates an example synchronized memory word write (SMWW) command 1300 that allows packet processor 804 to write a value to a bit-aligned address (e.g., to write a 32-bit value to a 32-bit-aligned address) in the memory map, and to stall issuance of further instructions until SMWW command 1300 completes. If SMWW command 1300 returns an error, the CR pointed to by bits 103:100 of condition register field 1010 will be asserted.

FIG. 14 illustrates an example conditional true memory word write (TMWW) command 1400 that allows packet processor 804 to write a value to a bit-aligned address in the memory map (e.g., to write a 32-bit value to a 32-bit-aligned address in the memory map), if a condition flag pointed to by bits 103:100 of condition register field 1010 is true.

FIG. 15 illustrates an example conditional false memory word write (FMWW) command 1500 that allows packet processor 804 to write a value to a bit-aligned address in the memory map (e.g., to write a 32-bit value to a 32-bit-aligned address in the memory map), if the condition flag pointed to by bits 103:100 of condition register field 1010 is false.

FIG. 16 illustrates an example conditional true synchronized memory word write (TSMWW) command 1600 that allows packet processor 804 to write a value to a bit-aligned address in the memory map (e.g., to write a 32-bit value to a 32-bit-aligned address in the memory map), if a condition flag pointed to by bits 103:100 of condition register field 1010 is true, and to stall issuance of further instructions until TSMWW command 1600 completes.

FIG. 17 illustrates an example conditional false synchronized memory word write (FSMWW) command 1700 that allows packet processor 804 to write a value to a bit-aligned address in the memory map (e.g., to write a 32-bit value to a 32-bit-aligned address in the CIM memory map), if a condition flag pointed to by bits 103:100 of condition register field 1010 is false, and to stall issuance of further instructions until FSMWW command 1700 completes.

FIG. 18 illustrates an example memory doubleword write (MDW) command 1800 that allows packet processor 804 to write a doubleword value to a bit-aligned address in the memory map (e.g., to write a 64-bit value to a 32-bit-aligned address in the CIM memory map).

FIG. 19 illustrates an example synchronized memory doubleword write (SMDW) command 1900 that allows packet processor 804 to write a doubleword value to a bit-aligned address in the memory map (e.g., to write a 64-bit value to a 32-bit-aligned address in the CIM memory map), and to stall issuance of further instructions until SMDW command 1900 completes. If SMDW command 1900 returns an error, the CR pointed to by bits 103:100 of condition register field 1010 will be asserted.

FIG. 20 illustrates an example conditional true memory doubleword write (TMDW) command 2000 that allows packet processor 804 to write a doubleword value to a bit-aligned address in the memory map (e.g., to write a 64-bit value to a 32-bit-aligned address in the CIM memory map), if a condition flag pointed to by bits 103:100 of condition register field 1010 is true.

FIG. 21 illustrates an example conditional false memory doubleword write (FMDW) command 2100 that allows packet processor 804 to write a doubleword value to a bit-aligned address in the memory map (e.g., to write a 64-bit value to a 32-bit-aligned address in the CIM memory map), if a condition flag pointed to by bits 103:100 of condition register field 1010 is false.

FIG. 22 illustrates an example memory quadword write (MQW) command 2200 that allows packet processor 804 to write a selectable number of quadwords to a bit-aligned address in the memory map (e.g., to write 1-256 quadwords to a 128-bit-aligned address in the memory map). The number of quadwords is one more than what is specified in bits 119-112 of length field 1004 (FIG. 10).

FIG. 23 illustrates an example compare (C) command 2300 that allows packet processor 804 to compare a masked value of the least significant word of the LDR with a specified value, and set a condition register based on the comparison. Example pseudo-code is provided below.

If (LDR[31:0] & Mask) equals Comp_Value) then CR[Condition_Reg] = 1
Else, CR[Condition_Reg] = 0

Figure 25:
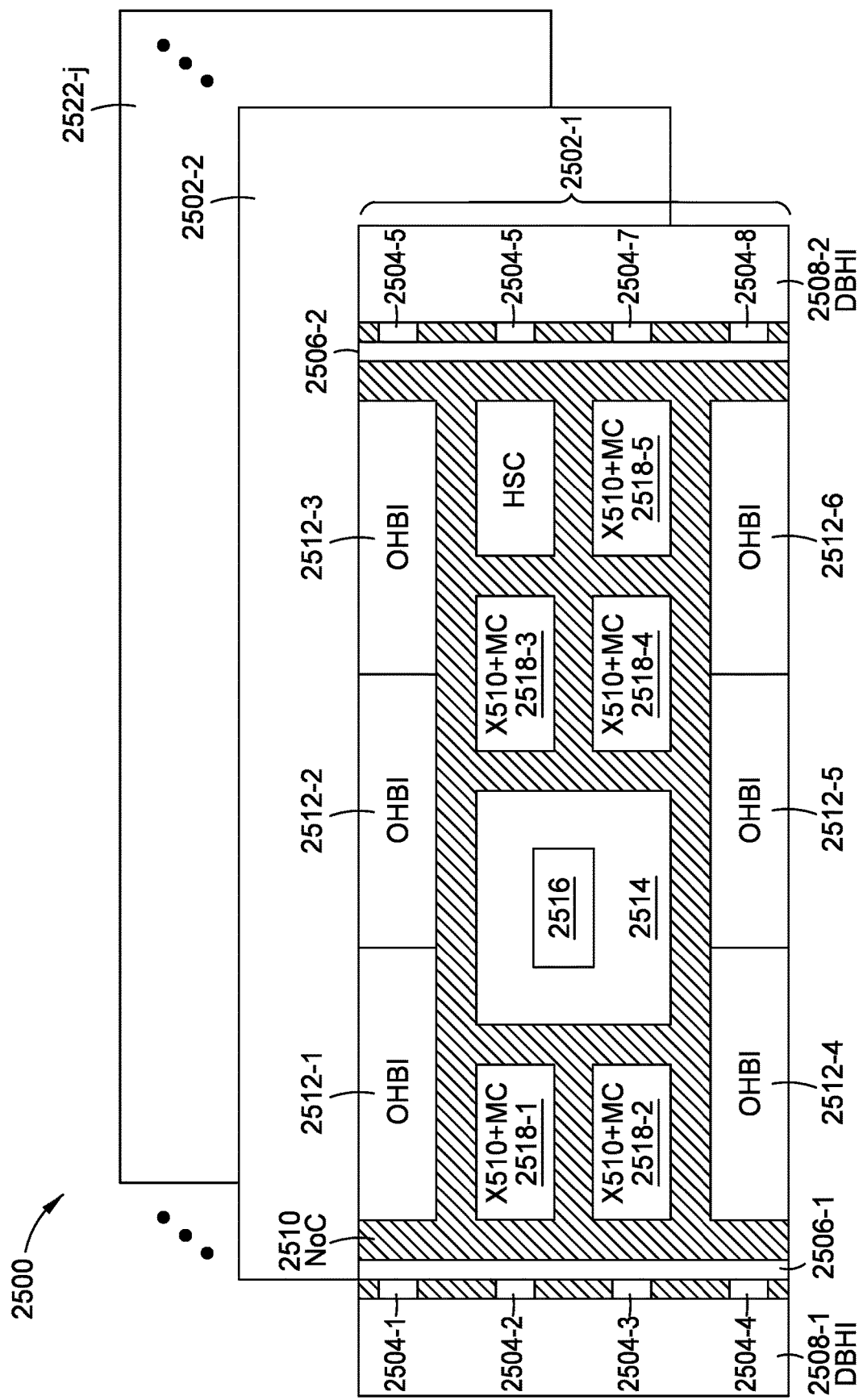
FIG. 25 is a block diagram of a multi-layer IC device, according to an embodiment.

FIG. 24 illustrates an example mask LDR word & write (MLWW) command 2400 that allows packet processor 804 to force different bits in the least significant word of the LPR to specified values, and to write the resulting word in a specified address in memory. Example pseudo-code is provided below Write (LDR[31:0] & Mask)|(Value[31:0] & !Mask)] to Location Address in Memory FIG. 25 is a block diagram of a multi-layer IC device 2500, according to an embodiment. IC device 2500 may represent an example embodiment of IC device 100.

IC device 2500 includes multiple stacks of dies 2502-1 through 2502-*j*, interconnected with chip-to-chip interfaces. Like multiple multi-story buildings, interconnected via the ground floors.

A base layer, or die 2502-1 may include management infrastructure circuitry (e.g., communication/interface circuitry, central management circuitry, and/or distributed management circuitry). Upper layers, or dies 2502-2 through 2502-*j* may include functional circuitry (e.g., functional circuitry 706 in FIG. 7). On or more upper layers may include PL fabric (e.g., PL 732 in FIG. 7). An uppermost die 2502-*j* may include, without limitation, one or more compute engines (e.g., artificial intelligence engines, or AIEs), which may be arranged as an array of compute engines.

In the example of FIG. 25, base die 2502-1, includes distributed management circuitry 2504-1 through 2504-4, distributed or positioned uniformly in a row, between a VNoC column 2506-1 and a DHBI column 2508-1. Base layer 2502-1 further includes distributed management circuitry 2504-5 through 2504-8, distributed or positioned uniformly in a row between a VNoC circuitry 2506-2 and a DHBI circuitry 2508-2. Other embodiments may include other numbers of CIMs (e.g., 2 columns of 8 CIMs). Distributed management circuitry 2504-1 through 2504-8 may represent example embodiments of distributed management circuitry 703 in FIG. 7, and may include respective CIM circuits 704. Distributed management circuitry 2504-1 through 2504-8 may be responsible for respective 3-dimensional regions of dies 2502-2 through 2502-*j*. may be associated with respective ones of distributed management circuitry 2504-1 through 2504-8.

Base layer 2502-1 further includes central management circuitry 2516 within a central region 2514 that streams configuration partitions to distributed management circuitry 2504-1 through 2504-8 through a NoC 2510 (e.g., NoC 716 in FIG. 7).

VNoC circuitry 2506 may represent vertical, or intra-die connections of NoC 2510.

DHBI columns 2508 may represent general purpose interconnect circuitry that connects to a chiplet or memory (e.g., high-bandwidth memory, or HBM, and/or high-volume memory, or HVM). DHBI columns 2508 include multiple interfaces to connect to multiple chiplets.

Base layer 2502-1 further includes intra-die, or intra-layer interface circuitry, illustrated here as OHBI circuitry 2512-1 through 2512-6, that provides connections between layers of IC device 2500. OHBI circuitry 2512 may interface between adjacent stacks of IC device 2500. OHBI circuitry 2512 may be positioned below PL circuitry of one or more upper layers, or dies 2502-2 through 2502-j. OHBI circuitry 2512 may represent or include local control interconnect, or LCI circuitry. Distributed management circuitry 2504-1 may be responsible for circuitry of base die 2502-1 and any chiplet or memory connected through DHBI column 2508-1 (e.g., off-chip device 711 in FIG. 7).

Base layer 2502-1 further includes multiple instances of input/output (I/O) circuitry and a memory controller, illustrated here as X5IO+MC 2518-1 through 2518-5 (collectively, X5IO+MC 2518). The I/O circuitry may provide fast input/output services for the respective memory controllers and/or for other purposes, such as to interface with PL fabric of IC device 2500. Multiple instances of the I/O circuitry and/or the memory controller may be useful for parallel operations (e.g., to access multiple memory devices in parallel), and/or to permit multiple sources of IC device 2500 to access the same resource serially. Multiple instances of X5IO+MC 2518 may used in conjunction with one another. For example, where an instance of X5IO+MC 2518 represents a 32-bit memory controller, two instances of X5IO+MC 2518 may be used in conjunction with one another to provide a 64-bit memory controller.

One or more of dies 2502 may include memory (i.e., on-die memory). Alternatively, or additionally, IC device 2500 may be configured to access external memory (e.g., external DRAM 710 in FIG. 7), which may include on-board memory (i.e., IC device 2500 and memory may be mounted on the same circuit board or integrated within the same IC package). Integrating IC device 2500 and external memory within an IC package may reduce memory access latency. IC device 2500 may access external memory, such as HBM, through DHBI columns 2508.

Programmable/configurable logic (PL) of one or more of the foregoing examples may include one or more of a variety of types of configurable circuit blocks, such as described below with reference to FIG. 26. FIG. 26 is a block diagram of configurable circuitry 2600, including an array of configurable or programmable circuit blocks or tiles, according to an embodiment. The example of FIG. 26 may represent a field programmable gate array (FPGA) and/or other IC device(s) that utilizes configurable interconnect structures for selectively coupling circuitry/logic elements, such as complex programmable logic devices (CPLDs).

In the example of FIG. 26, the tiles include multi-gigabit transceivers (MGTs) 2601, configurable logic blocks (CLBs) 2602, block random access memory (BRAM) 2603, input/output blocks (IOBs) 2604, configuration and clocking logic (Config/Clocks) 2605, digital signal processing (DSP) blocks 2606, specialized input/output blocks (I/O) 2607 (e.g., configuration ports and clock ports), and other programmable logic 2608, which may include, without limitation, digital clock managers, analog-to-digital converters, and/or system monitoring logic. The tiles further includes a dedicated processor 2610.

One or more tiles may include a programmable interconnect element (INT) 2611 having connections to input and output terminals 2620 of a programmable logic element within the same tile and/or to one or more other tiles. A programmable INT 2611 may include connections to interconnect segments 2622 of another programmable INT 2611 in the same tile and/or another tile(s). A programmable INT 2611 may include connections to interconnect segments 2624 of general routing resources between logic blocks (not shown). The general routing resources may include routing channels between logic blocks (not shown) including tracks of interconnect segments (e.g., interconnect segments 2624) and switch blocks (not shown) for connecting interconnect segments. Interconnect segments of general routing resources (e.g., interconnect segments 2624) may span one or more logic blocks. Programmable INTs 2611, in combination with general routing resources, may represent a programmable interconnect structure.

A CLB 2602 may include a configurable logic element (CLE) 2612 that can be programmed to implement user logic. A CLB 2602 may also include a programmable INT 2611.

A BRAM 2603 may include a BRAM logic element (BRL) 2613 and one or more programmable INTs 2611. A number of interconnect elements included in a tile may depends on a height of the tile. A BRAM 2603 may, for example, have a height of five CLBs 2602. Other numbers (e.g., four) may also be used.

A DSP block 2606 may include a DSP logic element (DSPL) 2614 in addition to one or more programmable INTs 2611. An IOB 2604 may include, for example, two instances of an input/output logic element (IOL) 2615 in addition to one or more instances of a programmable INT 2611. An I/O pad connected to, for example, an I/O logic element 2615, is not necessarily confined to an area of the I/O logic element 2615.

In the example of FIG. 26, config/clocks 2605 may be used for configuration, clock, and/or other control logic. Vertical columns 2609 may be used to distribute clocks and/or configuration signals.

A logic block (e.g., programmable of fixed-function) may disrupt a columnar structure of configurable circuitry 2600. For example, processor 2610 spans several columns of CLBs 2602 and BRAMs 2603. Processor 2610 may include one or more of a variety of components such as, without limitation, a single microprocessor to a complete programmable processing system of microprocessor(s), memory controllers, and/or peripherals.

In FIG. 26, configurable circuitry 2600 further includes analog circuits 2650, which may include, without limitation, one or more analog switches 267, multiplexers, and/or de-multiplexers. Analog switches 267 may be useful to reduce leakage current.

FIG. 26 is provided for illustrative purposes. Configurable circuitry 2600 is not limited to numbers of logic blocks in a row, relative widths of the rows, numbers and orderings of rows, types of logic blocks included in the rows, relative sizes of the logic blocks, illustrated interconnect/logic implementations, or other example features of FIG. 26.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC) device, comprising:
   functional circuitry;
   a first communication channel; and
   distributed management circuitry comprising a plurality of configuration interface manager (CIM) circuits configured to receive respective programming partitions as respective configuration packets over the first communication channel, and provide configuration parameters to respective regions of the functional circuitry in parallel with one another based on the respective configuration packets.

2. The IC device of claim 1, further comprising central management circuitry configured to stream the configuration packets to random access memory (RAM) packet buffers of the respective CIM circuits over the first communication channel.

3. The IC device of claim 2, wherein the central management circuitry comprises:
a direct memory access (DMA) engine configured to stream the configuration packets to the respective CIM circuits over the first communication channel.

4. The IC device of claim 2, wherein the central management circuitry is further configured to configure the first communication channel and the CIM circuits over a second communication channel during an initialization phase of the IC device.

5. The IC device of claim 4, wherein:
the second communication channel comprises global communication ring (GCR) interconnect circuitry;
the central management circuitry is further configured to provide electronic fuse (eFuse) information to the CIM circuits over the GCR interconnect circuitry; and
the CIM circuits comprise respective GCR nodes configured to capture the eFuse information from the GCR interconnect circuitry, and to communicate with one or more of the central management circuitry and other GCR nodes of the IC device.

6. The IC device of claim 2, wherein the CIM circuits comprise respective direct memory access (DMA) command engines configured to read the configuration packets from external memory over the first communication channel and store the configuration packets in the RAM packet buffers of the respective CIM circuits.

7. The IC device of claim 1, wherein a first one of the CIM circuits comprises:
random access memory (RAM) comprising packet buffers to store the configuration packets; and
a packet processor configured to retrieve the configuration packets from the packet buffers, extract commands from the configuration packets, and execute the commands.

8. The IC device of claim 7, wherein the first CIM circuit further comprises:
a direct memory access (DMA) data engine configured to access data buffers of the RAM in response to a command executed by the packet processor; and
a DMA command engine configured to read the configuration packets from an external memory and store the configuration packet in the packet buffers.

9. The IC device of claim 8, wherein:
the DMA data engine and the DMA command engine are configured to perform respective operations in parallel with one another.

10. The IC device of claim 8, wherein:
the packet processor is further configured to initiate a readback operation to read state information from a portion of a first region of the functional circuitry; and
the DMA data engine is further configured to receive readback data from the packet processor and write the readback data to one or more of the RAM and external memory.

11. The IC device of claim 10, wherein:
the packet processor is further configured to reconfigure the portion of the first region of the functional circuitry with the readback data.

12. The IC device of claim 10, wherein the readback data comprises contents of configuration registers of the first region of the functional circuitry, and wherein the first CIM circuit further comprises error detection circuitry configured to check the readback data for errors.

13. The IC device of claim 8, further comprising central management circuitry, wherein the first CIM circuit further comprises authentication circuitry, and wherein:
the central management circuitry is configured to provide a first hash value for the first configuration packet of the stream of the configuration packets to the first CIM circuit;
the DMA data engine is further configured to provide hash values contained in headers of subsequent configuration packets of the stream of configuration packets to the authentication circuitry; and
the authentication circuitry is configured to authenticate the first configuration packet of the stream of configuration packets based on the first hash value, and to authenticate the subsequent configuration packets based on the hash values contained in the headers of respective preceding ones of the configuration packets.

14. The IC device of claim 7, wherein:
the first CIM circuit further comprises decryption circuitry; and
the packet processor is further configured to retrieve the configuration packets from the packet buffers, forward the configuration packets to the decryption circuitry, and extract commands from the configuration packets subsequent to decryption of the respective configuration packets.

15. The IC device of claim 8, wherein the first CIM circuit further comprises a memory controller to control access to the RAM, and interconnect circuitry configured to interface between the first CIM circuit and the first communication channel and to interface amongst circuitry of the first CIM, and wherein the interconnect circuitry comprises:
master and slave interface circuitry configured to interface with the first communication channel over respective n-bit buses to receive the configuration packets from the first communication channel and to output data to the first communication channel, wherein n is a positive integer; and
additional master and slave interface circuitry configured to interface with the packet processor, the memory controller, the DMA data engine, the DMA command engine, and the respective region of the functional circuitry over respective additional n-bit buses.

16. An integrated circuit (IC) device, comprising:
a first IC die comprising distributed management circuitry, a first communication channel, and first functional circuitry;
a second IC die comprising second functional circuitry; and
a second communication channel comprising a chip-to-chip (C2C) communication channel configured to interface between the first communication channel and the second IC die;
wherein the distributed management circuitry comprises a plurality of configuration interface manager (CIM) circuits configured to receive respective programming partitions as respective configuration packets over the first communication channel, and provide configuration parameters to respective regions of the first functional circuitry in parallel with one another based on the respective configuration packets; and
wherein a first one of the CIM circuits is further configured to receive a programming partition for the second IC die as additional configuration packets over the first communication channel, and provide configuration parameters to the second IC die through the first communication channel and the C2C communication channel based on the additional configuration packets.

17. The IC device of claim 16, further comprising central management circuitry, wherein the first CIM circuit comprises:
- random access memory (RAM) comprising packet buffers to store the configuration packets, and data buffers;
- a RAM controller configured to control access to the RAM;
- a packet processor configured to retrieve the configuration packets from the packet buffers, extract commands from the configuration packets, and execute the commands;
- a direct memory access (DMA) data engine configured to write the configuration packets streamed from the central management circuitry to the packet buffers and to access the data buffers in response to a command executed by the packet processor; and
- a DMA command engine configured to read the configuration packets from external memory and store the configuration packets in the packet buffers.

18. The IC device of claim 1, wherein the first communication channel comprises a packet-switched network-on-chip (NoC).

19. The IC device of claim 16, wherein the first communication channel comprises a packet-switched network-on-chip (NoC).

* * * * *